US009829983B2

(12) United States Patent
Park et al.

(10) Patent No.: US 9,829,983 B2
(45) Date of Patent: Nov. 28, 2017

(54) MOBILE SYSTEMS INCLUDING IMAGE SENSORS, METHODS OF OPERATING IMAGE SENSORS, AND METHODS OF OPERATING MOBILE SYSTEMS

(71) Applicants: Yoon-Dong Park, Osan-si (KR);
Won-Joo Kim, Hwaseong-si (KR);
Young-Gu Jin, Osan-si (KR);
Dong-Wook Kwon, Suwon-si (KR);
Kyung-Il Kim, Anyang-si (KR);
Min-Ho Kim, Seongnam-si (KR);
Gi-Sang Lee, Hwaseong-si (KR);
Sang-Bo Lee, Yongin-si (KR);
Jin-Kyung Lee, Suwon-si (KR);
Jin-Wuk Choi, Seoul (KR)

(72) Inventors: Yoon-Dong Park, Osan-si (KR);
Won-Joo Kim, Hwaseong-si (KR);
Young-Gu Jin, Osan-si (KR);
Dong-Wook Kwon, Suwon-si (KR);
Kyung-Il Kim, Anyang-si (KR);
Min-Ho Kim, Seongnam-si (KR);
Gi-Sang Lee, Hwaseong-si (KR);
Sang-Bo Lee, Yongin-si (KR);
Jin-Kyung Lee, Suwon-si (KR);
Jin-Wuk Choi, Seoul (KR)

(73) Assignee: Samsung Electronic Co., Ltd., Gyeonggi-Do (KR)

( * ) Notice: Subject to any disclaimer, the term of this patent is extended or adjusted under 35 U.S.C. 154(b) by 50 days.

(21) Appl. No.: 14/061,036

(22) Filed: Oct. 23, 2013

(65) Prior Publication Data
US 2014/0111423 A1    Apr. 24, 2014

(30) Foreign Application Priority Data
Oct. 23, 2012 (KR) .................. 10-2012-0117760

(51) Int. Cl.
G09G 5/00 (2006.01)
G06F 3/01 (2006.01)
(Continued)

(52) U.S. Cl.
CPC .............. G06F 3/017 (2013.01); G06F 3/011 (2013.01); G06F 3/0416 (2013.01);
(Continued)

(58) Field of Classification Search
CPC . G06F 3/00; G06F 3/011; G06F 3/012; G06F 3/016; G06F 3/017; G06F 3/038;
(Continued)

(56) References Cited

U.S. PATENT DOCUMENTS 7,053,937 B1    5/2006  Aoki
7,348,962 B2    3/2008  Doi et al.
(Continued)

FOREIGN PATENT DOCUMENTS

CN    102662460 A    9/2012
JP    2010-025906 A   2/2010
(Continued)

OTHER PUBLICATIONS

Chinese Office Action dated Aug. 22, 2017 for corresponding CN Application No. 201310504921.7.

Primary Examiner — Kent Chang
Assistant Examiner — Mark Edwards
(74) Attorney, Agent, or Firm — Harness, Dickey & Pierce, P.L.C.

(57) ABSTRACT

A mobile system may comprise a three-dimensional (3D) image sensor on a first surface of the mobile system configured to perform a first sensing to detect proximity of a subject and a second sensing to recognize a gesture of the subject by acquiring distance information for the subject; and/or a display device on the first surface of the mobile
(Continued)

system to display results of the first sensing and the second sensing. A mobile system may comprise a light source unit; a plurality of depth pixels; and/or a plurality of color pixels. The light source unit, the plurality of depth pixels, or the plurality of color pixels may be activated based on an operation mode of the mobile system.

21 Claims, 37 Drawing Sheets

(51) Int. Cl.
*G06F 3/041* (2006.01)
*G06F 1/32* (2006.01)
(52) U.S. Cl.
CPC .. *G06F 1/3262* (2013.01); *G06F 2203/04101* (2013.01); *G06F 2203/04106* (2013.01)
(58) Field of Classification Search
CPC .............. G06F 3/0338; G06F 3/04883; G06F 3/03543; G06F 3/04815; G06K 9/00335
See application file for complete search history.

(56) References Cited

U.S. PATENT DOCUMENTS

| 8,139,142 | B2 | 3/2012 | Bamji et al. | |
| 8,558,759 | B1* | 10/2013 | Prada Gomez | G06F 3/017 345/156 |
| 2010/0020209 | A1 | 1/2010 | Kim | |
| 2010/0033611 | A1* | 2/2010 | Lee | H01L 27/14645 348/302 |
| 2010/0123771 | A1 | 5/2010 | Moon et al. | |
| 2011/0063437 | A1 | 3/2011 | Watanabe et al. | |
| 2011/0129123 | A1 | 6/2011 | Ovsiannikov et al. | |
| 2011/0285825 | A1* | 11/2011 | Tian | H04N 9/646 348/47 |
| 2012/0127128 | A1* | 5/2012 | Large | G06F 3/0425 345/175 |
| 2012/0236121 | A1* | 9/2012 | Park | H04N 13/0271 348/46 |
| 2012/0287035 | A1* | 11/2012 | Valko | G06F 1/3231 345/156 |
| 2013/0106681 | A1* | 5/2013 | Eskilsson | G06K 9/00597 345/156 |

FOREIGN PATENT DOCUMENTS

| JP | 2011-013138 A | 1/2011 |
| JP | 2012-053274 A | 3/2012 |

* cited by examiner

1000

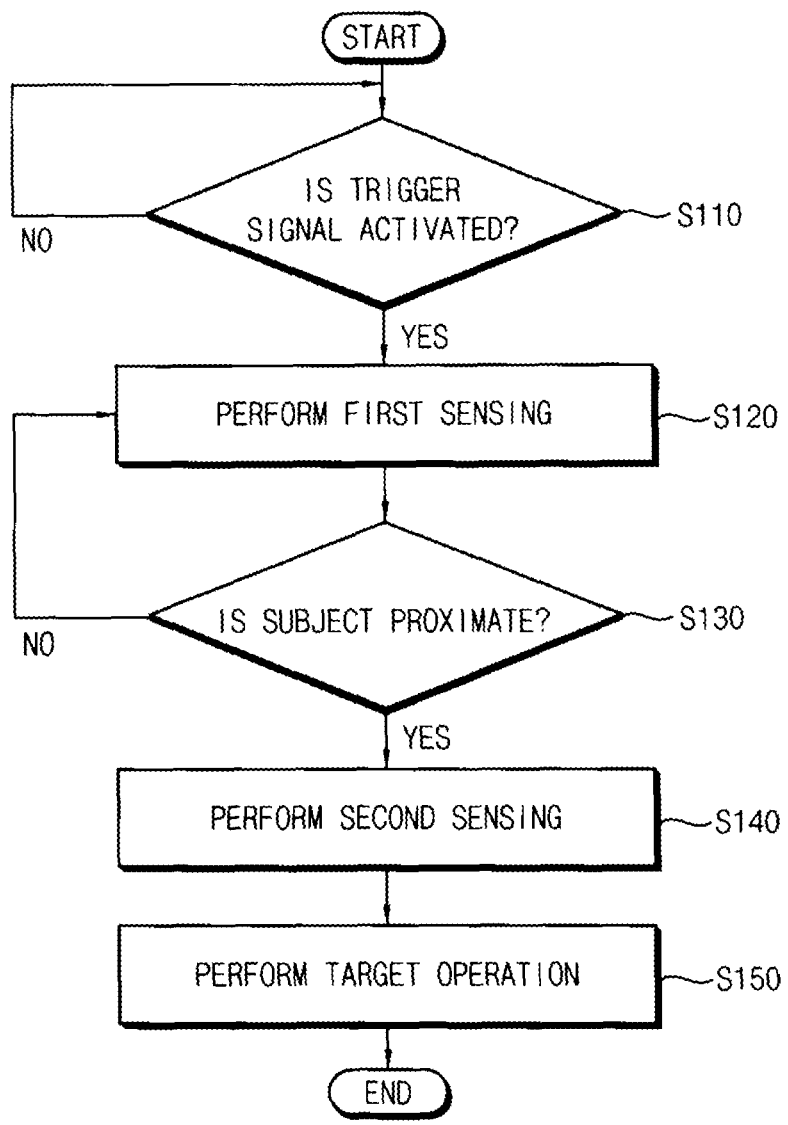

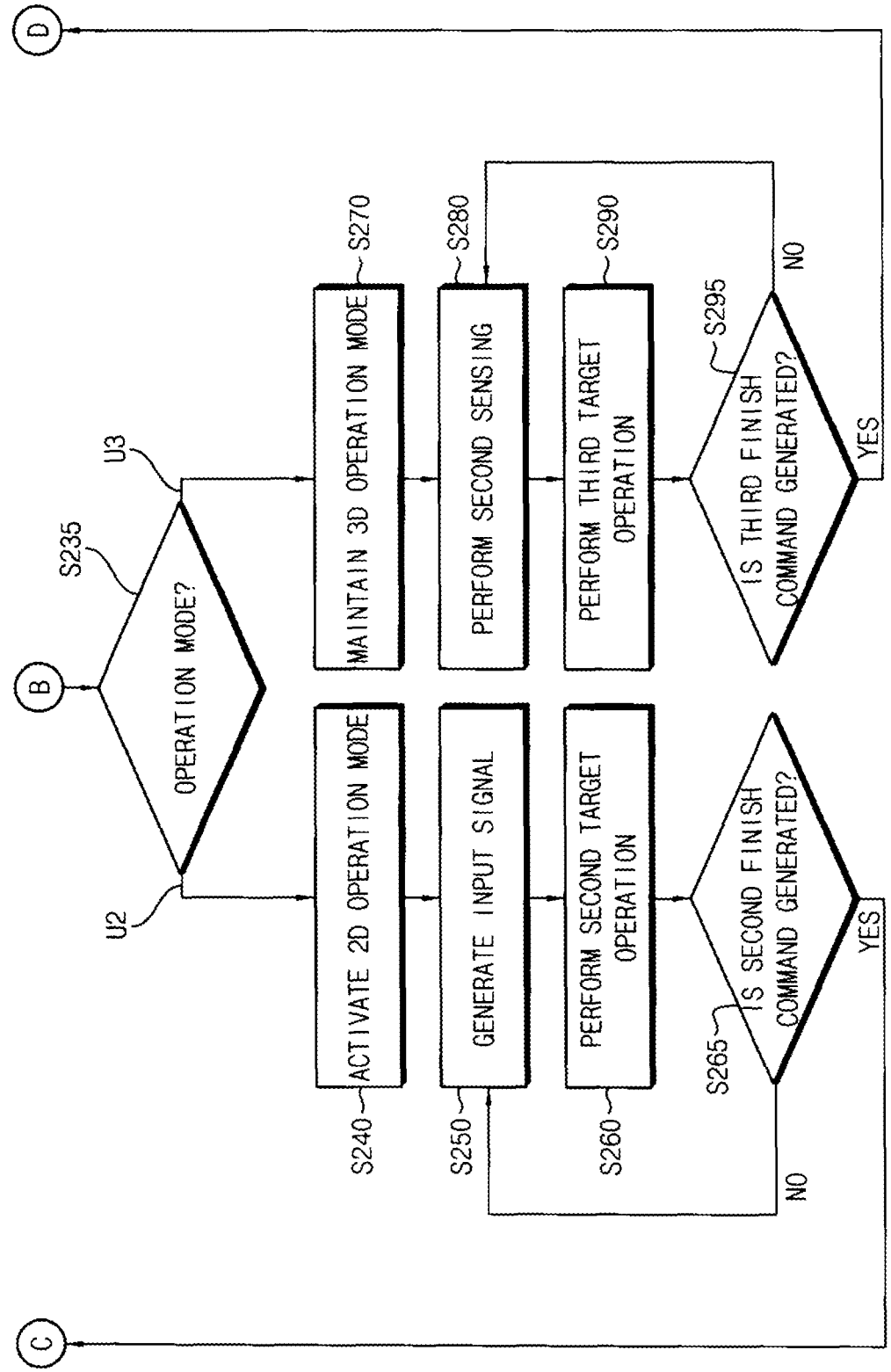

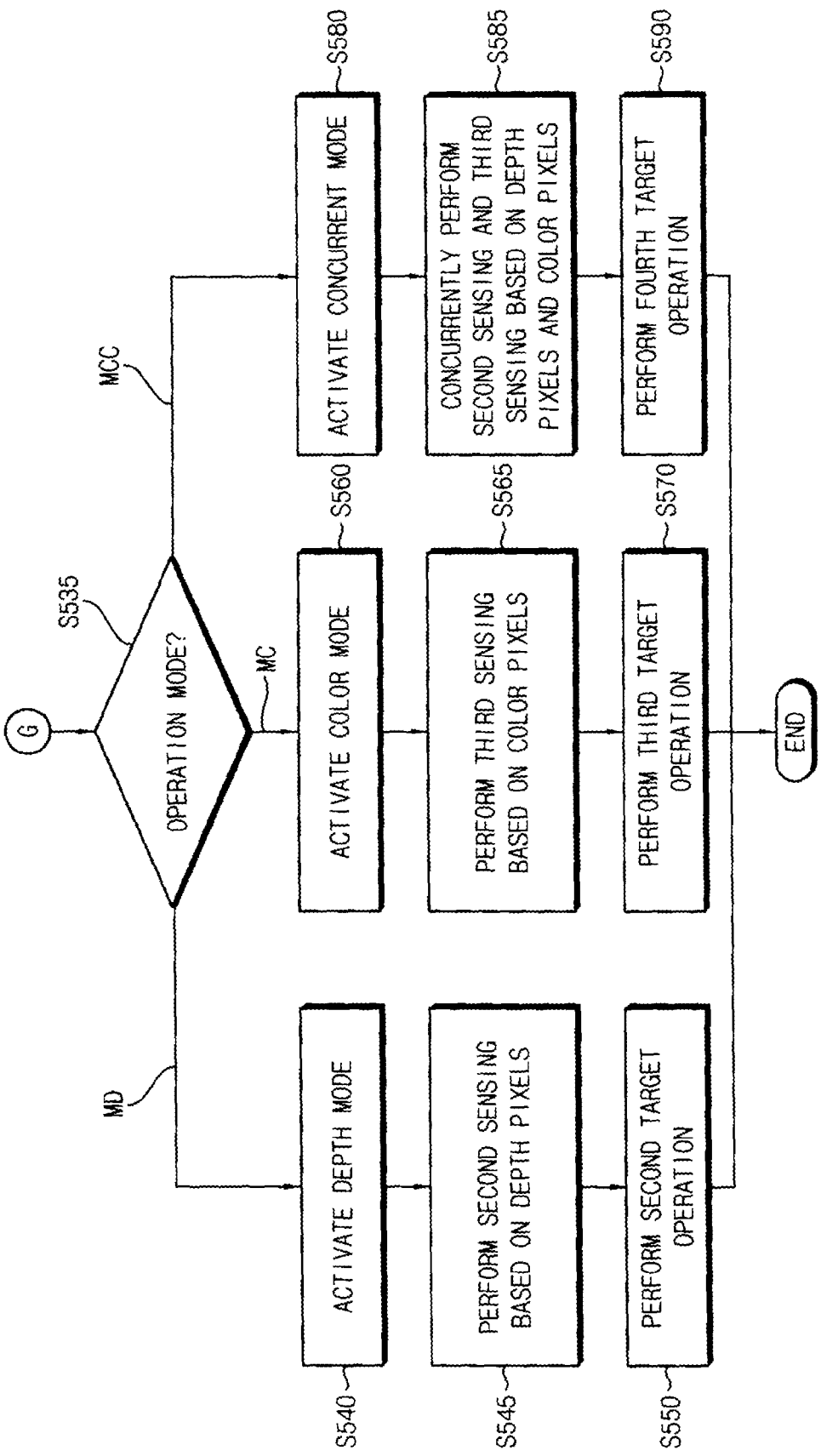

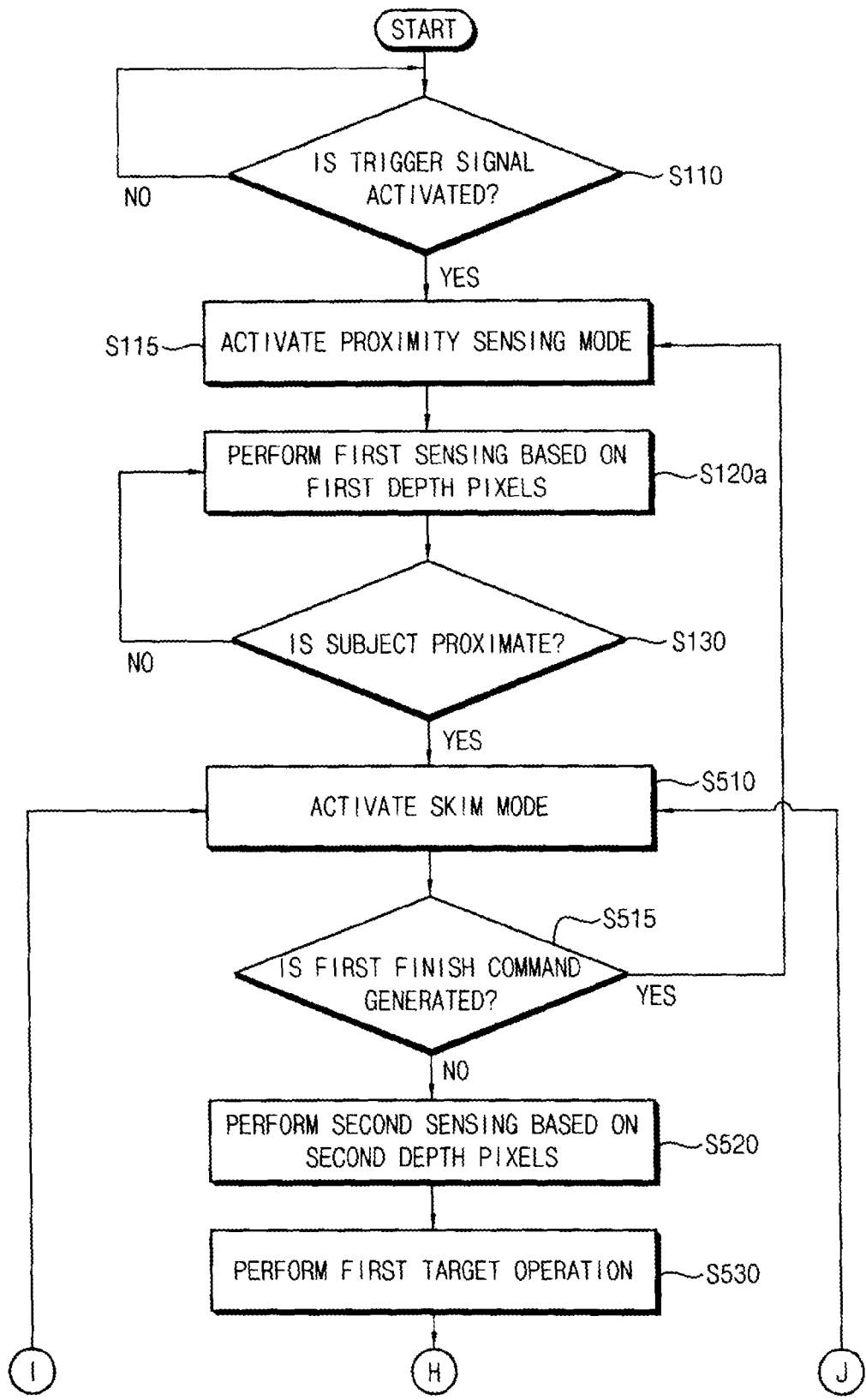

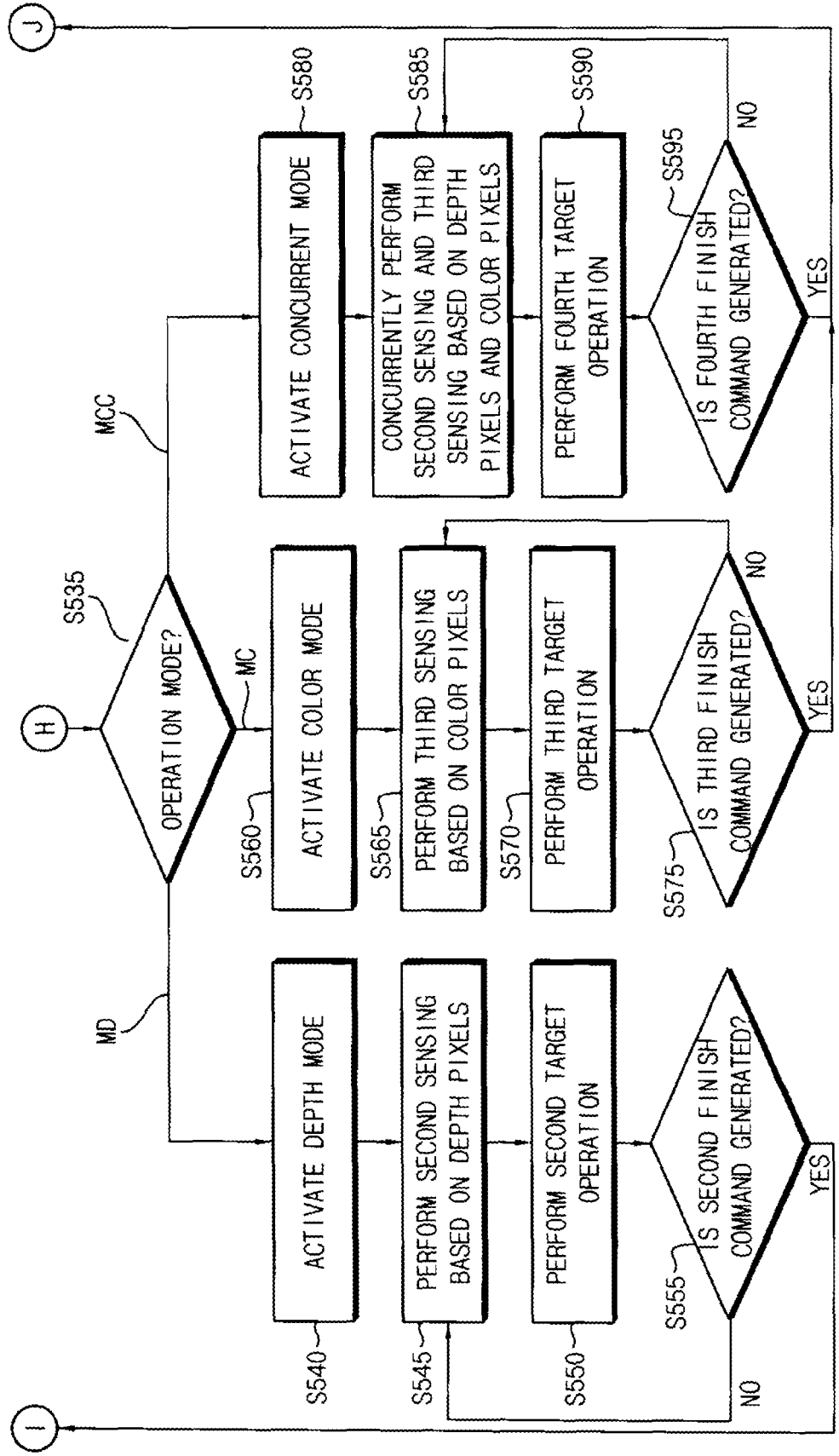

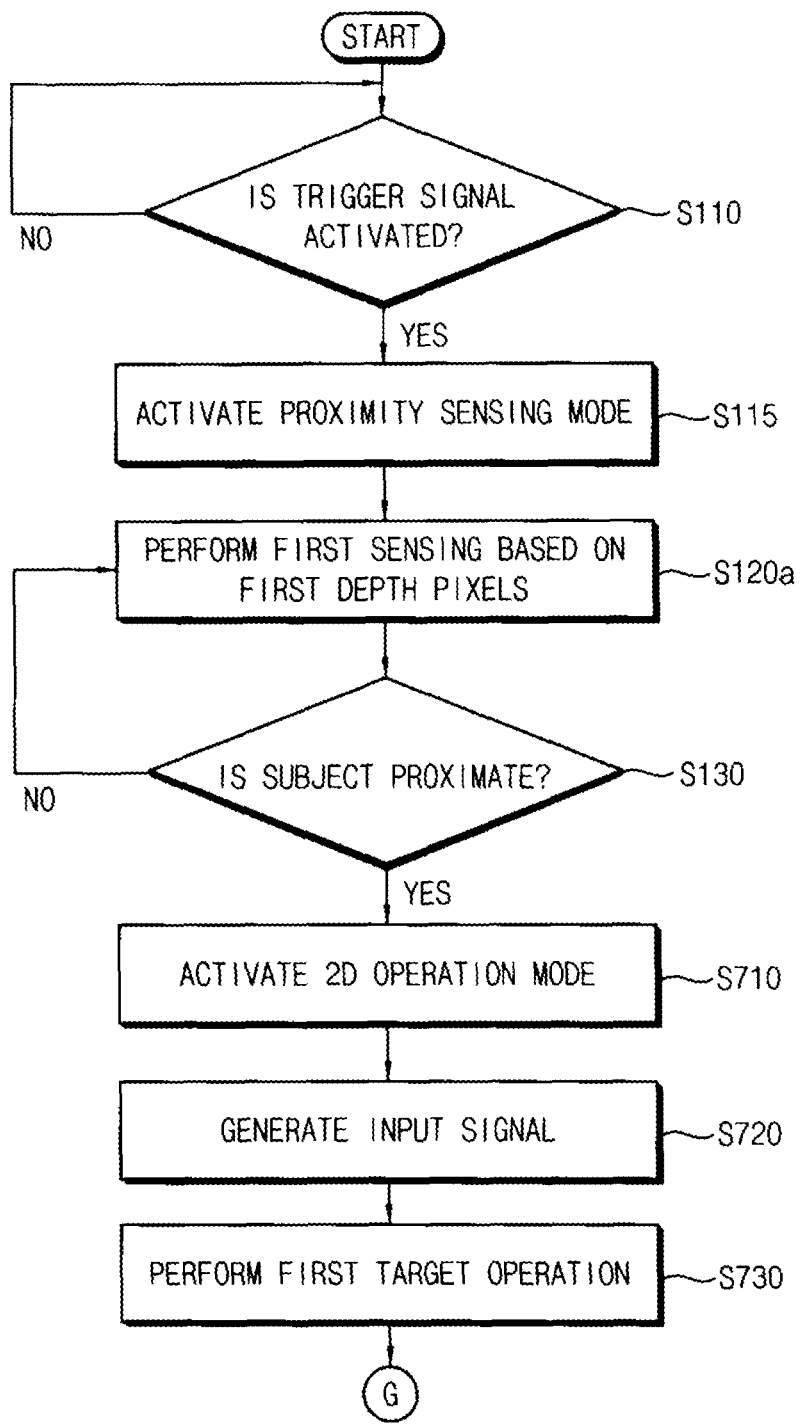

MOBILE SYSTEMS INCLUDING IMAGE SENSORS, METHODS OF OPERATING IMAGE SENSORS, AND METHODS OF OPERATING MOBILE SYSTEMS

CROSS-REFERENCE TO RELATED APPLICATION(S)

This application claims priority from Korean Patent Application No. 10-2012-0117760, filed on Oct. 23, 2012, in the Korean Intellectual Property Office (KIPO), the entire contents of which are incorporated herein by reference.

BACKGROUND

1. Technical Field

Some example embodiments may relate generally to image sensors. Some example embodiments may relate to mobile systems including image sensors, methods of operating the image sensors, and methods of operating the mobile systems including the image sensors.

2. Description of Related Art

An image sensor is a device to convert an optical signal including information about an image or a distance (e.g., depth) into an electric signal. Studies for the image sensor have been actively pursued to accurately and precisely provide required information. Especially, studies and research have been actively carried out for a three-dimensional (3D) image sensor capable of providing distance information as well as image information. The 3D image sensor is mainly used for motion recognition or gesture recognition. Meanwhile, if a 3D display is applied to a mobile system in the future, a user interface employing a space touch scheme may be required. In this regard, technologies to effectively install the 3D image sensor in a mobile system and technologies to reduce power consumption of the 3D image sensor may be required.

SUMMARY

Some example embodiments may provide mobile systems equipped with 3D image sensors to perform proximity sensing and/or motion recognition without increasing size of the mobile systems.

Some example embodiments may provide methods of operating image sensors capable of performing proximity sensing and/or motion recognition.

Some example embodiments may provide methods of operating mobile systems including image sensors capable of performing proximity sensing and/or motion recognition.

In some example embodiments, a mobile system may comprise a three-dimensional (3D) image sensor on a first surface of the mobile system configured to perform a first sensing to detect proximity of a subject and a second sensing to recognize a gesture of the subject by acquiring distance information for the subject; and/or a display device on the first surface of the mobile system to display results of the first sensing and the second sensing.

In some example embodiments, a first operation mode to perform the first sensing may be activated based on a trigger signal. The second sensing may be selectively performed when a result of the first sensing represents that the subject is proximate to the 3D image sensor.

In some example embodiments, the mobile system may further comprise an input device to receive a user's input. At least one of a second operation mode to perform a first target operation based on the second sensing and a third operation mode to perform a second target operation based on an input signal generated by the input device may be activated when the subject is proximate to the 3D image sensor.

In some example embodiments, the second operation mode may be activated when the subject is proximate to the 3D image sensor and/or an operation mode of the mobile system may be maintained in the second operation mode or converted from the second operation mode to the third operation mode based on the first target operation.

In some example embodiments, the third operation mode may be activated when the subject is proximate to the 3D image sensor and an operation mode of the mobile system is maintained in the third operation mode or converted from the third operation mode to the second operation mode based on the second target operation.

In some example embodiments, the second operation mode and the third operation mode may be concurrently activated when the subject is proximate to the 3D image sensor.

In some example embodiments, the mobile system may further comprise a two-dimensional (2D) image sensor on the first surface of the mobile system to perform a third sensing to acquire color image information for the subject.

In some example embodiments, a first operation mode to perform the first sensing may be activated based on a trigger signal and at least one of the second sensing and the third sensing is performed when a result of the first sensing represents that the subject is proximate to the 3D image sensor.

In some example embodiments, the 3D image sensor may comprise a plurality of depth pixels and may perform the first sensing in the first operation mode based on first depth pixels that are adjacent to each other among the depth pixels.

In some example embodiments, the 3D image sensor may comprise a plurality of depth pixels and the 2D image sensor may comprise a plurality of color pixels. One of a second operation mode to perform the second sensing based on first depth pixels that are adjacent to each other while constituting a partial array among the depth pixels, a third operation mode to perform the second sensing based on the depth pixels, a fourth operation mode to perform the third sensing based on the color pixels, and a fifth operation mode to concurrently perform the second sensing and the third sensing based on the depth pixels and the color pixels may be activated when the subject is proximate to the 3D image sensor.

In some example embodiments, the second operation mode may be activated when the subject is proximate to the 3D image sensor and an operation mode of the mobile system is converted from the second operation mode to one of third to fifth operation modes based on a result of the second sensing performed in the second operation mode.

In some example embodiments, the third operation mode may be activated when the subject is proximate to the 3D image sensor and an operation mode of the mobile system is maintained in the third operation mode or converted from the third operation mode to one of fourth and fifth operation modes based on a result of the second sensing performed in the third operation mode.

In some example embodiments, the third sensing may be further performed based on at least a part of the color pixels when the second operation mode is activated.

In some example embodiments, the 3D image sensor and the 2D image sensor may be one integrated circuit chip or two integrated circuit chips separated from each other.

In some example embodiments, the 3D image sensor may comprise a plurality of depth pixels, the 2D image sensor may comprise a plurality of color pixels, and the depth pixels and the color pixels may constitute one pixel array or two pixel arrays separated from each other.

In some example embodiments, the 3D image sensor may comprise a light source unit that is not activated when the first sensing is performed and that is activated when the second sensing is performed.

In some example embodiments, the 3D image sensor may comprise a light source unit that emits low-brightness light when the first sensing is performed and that emits high-brightness light when the second sensing is performed.

In some example embodiments, a method of operating a three-dimensional (3D) image sensor may comprise performing a first sensing based on a trigger signal to detect proximity of a subject; and/or performing a second sensing to recognize a gesture of the subject by acquiring distance information for the subject when a result of the first sensing represents that the subject is proximate to the 3D image sensor.

In some example embodiments, the method may further comprise performing a target operation based on the second sensing.

In some example embodiments, the 3D image sensor may comprise a plurality of depth pixels. The first sensing may be performed based on a part of the depth pixels and the second sensing is performed based on all of the depth pixels.

In some example embodiments, a method of operating an image sensor including a plurality of depth pixels and color pixels may comprise performing a first sensing based on a trigger signal to detect proximity of a subject; and/or performing at least one of a second sensing to recognize a gesture of the subject by acquiring distance information for the subject and a third sensing to acquire color image information of the subject when a result of the first sensing represents that the subject is proximate to the image sensor.

In some example embodiments, the performing of at least one of the second sensing and the third sensing may comprise performing the second sensing based on first depth pixels that are adjacent to each other while constituting a partial array among the depth pixels; performing the second sensing based on the depth pixels; performing the third sensing based on the color pixels; and/or concurrently performing the second sensing and the third sensing based on the depth pixels and the color pixels.

In some example embodiments, the performing of at least one of the second sensing and the third sensing may further comprise converting an operation mode of the image sensor based on a result of the second sensing performed based on the first depth pixels.

In some example embodiments, a method of operating a mobile system including a three-dimensional (3D) image sensor may comprise performing a first sensing based on a trigger signal to detect proximity of a subject; and/or selectively performing a second sensing to recognize a gesture of the subject by acquiring distance information for the subject when a result of the first sensing represents that the subject is proximate to the image sensor.

In some example embodiments, the mobile system may further include an input device to receive a user's input. The selective performing of the second sensing may comprise performing a first target operation based on the second sensing; and/or performing a second target operation based on an input signal generated by the input device.

In some example embodiments, a mobile system may comprise a light source unit; a plurality of depth pixels; and/or a plurality of color pixels. The light source unit, at least one of the plurality of depth pixels, or at least one of the plurality of color pixels may be activated based on an operation mode of the mobile system.

In some example embodiments, the light source unit may be activated based on the operation mode of the mobile system.

In some example embodiments, at least two of the plurality of depth pixels may be activated based on the operation mode of the mobile system.

In some example embodiments, all of the plurality of depth pixels may be activated based on the operation mode of the mobile system.

In some example embodiments, the plurality of color pixels may be activated based on the operation mode of the mobile system.

In some example embodiments, the light source unit, the at least one of the plurality of depth pixels, or the at least one of the plurality of color pixels may be activated based on an operation mode of the mobile system in order to reduce power consumption of the mobile system.

In some example embodiments, the light source unit, the at least one of the plurality of depth pixels, and the at least one of the plurality of color pixels may be activated based on an operation mode of the mobile system in order to reduce power consumption of the mobile system.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 4 is a flowchart illustrating a method of operating an image sensor according to some example embodiments;

FIGS. 9A and 9B are flowcharts illustrating a method of operating a mobile system according to some example embodiments;

FIGS. 16A and 16B are flowcharts illustrating a method of operating an image sensor according to some example embodiments;

FIGS. 21A and 21B are flowcharts illustrating a method of operating an image sensor according to some example embodiments;

FIG. 23 is a flowchart illustrating a method of operating a mobile system according to some example embodiments;

DETAILED DESCRIPTION

Figure 1:
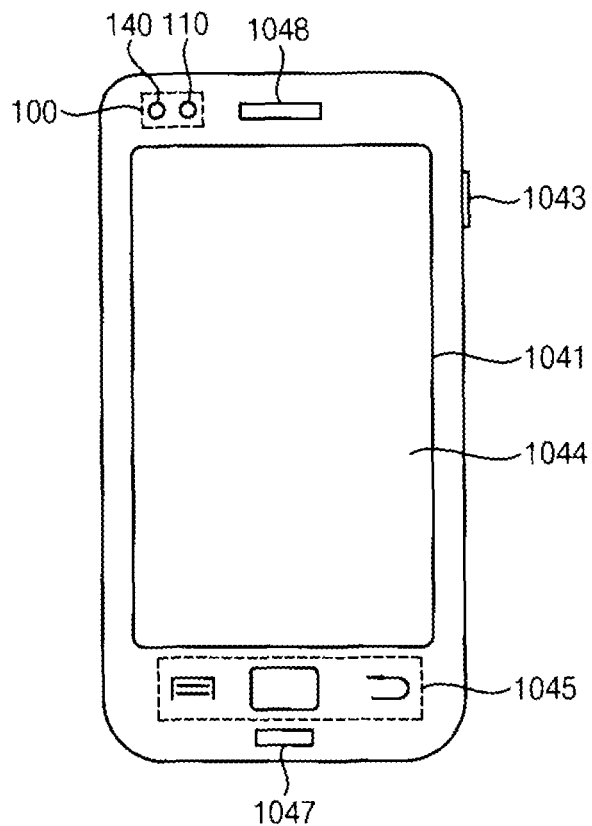
FIG. 1 is a plan view illustrating a mobile system according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a plan view illustrating a mobile system according to some example embodiments. Some example embodiments of mobile systems may comprise image sensors that detect proximity, depth, and/or color. Some example embodiments of mobile systems may comprise image sensors that do not detect proximity. Some example embodiments of mobile systems may comprise image sensors that do not detect depth. Some example embodiments of mobile systems may comprise image sensors that do not detect color.

Referring to FIG. 1, the mobile system 1000 includes a 3D image sensor 100 and a display device 1041. The mobile system 1000 may further include a touch screen 1044, buttons 1043 and 1045, a microphone 1047, and a speaker 1048.

The 3D image sensor 100 is installed on a first surface (for instance, a front surface) of the mobile system 1000. The 3D image sensor 100 performs a first sensing to detect proximity of a subject and a second sensing to recognize a gesture of the subject by acquiring distance information for the subject. That is, the 3D image sensor 100 may have the proximity sensing function and the gesture recognition function.

The 3D image sensor 100 may include a sensing unit 110 having a plurality of depth pixels and a light source unit 140 to emit infrared rays or near-infrared rays. The light source unit 140 may be selectively activated or may emit lights having mutually different brightness according to the operation mode. In addition, all or part of the depth pixels included in the sensing unit 110 may be activated according to the operation mode. The detailed operation and structure of the 3D image sensor 100 will be described later.

In some example embodiments, the 3D image sensor 100 may be one of various types of depth sensors that require a light source and adopt a TOF (Time of Flight) scheme, a structured light scheme, a patterned light scheme, or an intensity map scheme.

In FIG. 1, the 3D image sensor 100 is installed at a left upper portion of a front surface of the mobile system 1000. However, the 3D image sensor 100 can be installed at a predetermined portion of the mobile system 1000 to perform the proximity sensing and the gesture recognition.

The display device 1041 is installed on the first surface of the mobile system 1000 to display the result of the first sensing and the second sensing. The display device 1041 may include various types of display panels, such as an LCD (Liquid Crystal Display), an OLED (Organic Light Emitting Diode) display, and an FED (Field Emission Display) configured to display images.

The touch screen 1044 and the buttons 1043 and 1045 may receive user's input and may generate input signals to perform the function intended by the user (for instance, target operation) based on the user's input. For instance, as a user's finger or a stylus pen touches a surface of the touch screen 1044, the function intended by the user can be performed. In addition, the function intended by the user can be performed as the user's finger presses the buttons 1043 and 1045. The button 1043 may be a power button to activate or inactivate the mobile system 1000. The microphone 1047 may perform the voice recognition and the speaker 1048 may output the voice.

In some example embodiments, the touch screen 1044 may be one of various types of touch screens, such as a capacitive type touch screen, a resistive type touch screen, and an ultrasonic type touch screen. The touch screen 1044 and the display device 1041 may be integrally disposed while overlapping with each other. According to some example embodiments, at least one of the buttons 1043 and 1045, the microphone 1047, and the speaker 1048 may be omitted.

A mobile system according to the related art includes various input/output devices installed on a front surface of the mobile system, such as a proximity sensor to perform the proximity sensing, a display device, a touch screen, a button, a microphone, and a speaker. Thus, when the motion recognition function is added to the mobile system, a 3D image sensor 100 may not be readily installed in the mobile system unless the size of the mobile system is increased.

The mobile system according to some example embodiments includes the 3D image sensor 100 that performs proximity sensing and motion recognition. The 3D image sensor 100 may operate as a proximity sensor when the first sensing is performed and may operate as a general depth sensor when the second sensing is performed. Since the mobile system 1000 includes only one 3D image sensor 100 without the proximity sensor and the depth sensor, the mobile system 1000 may have the motion recognition function as well as the proximity sensing function without increasing the size of the mobile system 1000. In addition, the 3D image sensor 100 may be operated in various schemes according to the operation mode thereof. For instance, when the first sensing is performed, the light source unit 140 is inactivated or emits light having low brightness and some depth pixels included in the sensing unit 110 are activated so that power consumption of the 3D image sensor 100 and the mobile system 1000 can be reduced. In addition, when the second sensing is performed, the light source unit 140 is activated or emits light having high brightness and all of the depth pixels may be activated so that the 3D image sensor 100 and the mobile system 1000 can accurately recognize the motion of the subject.

Figure 2:
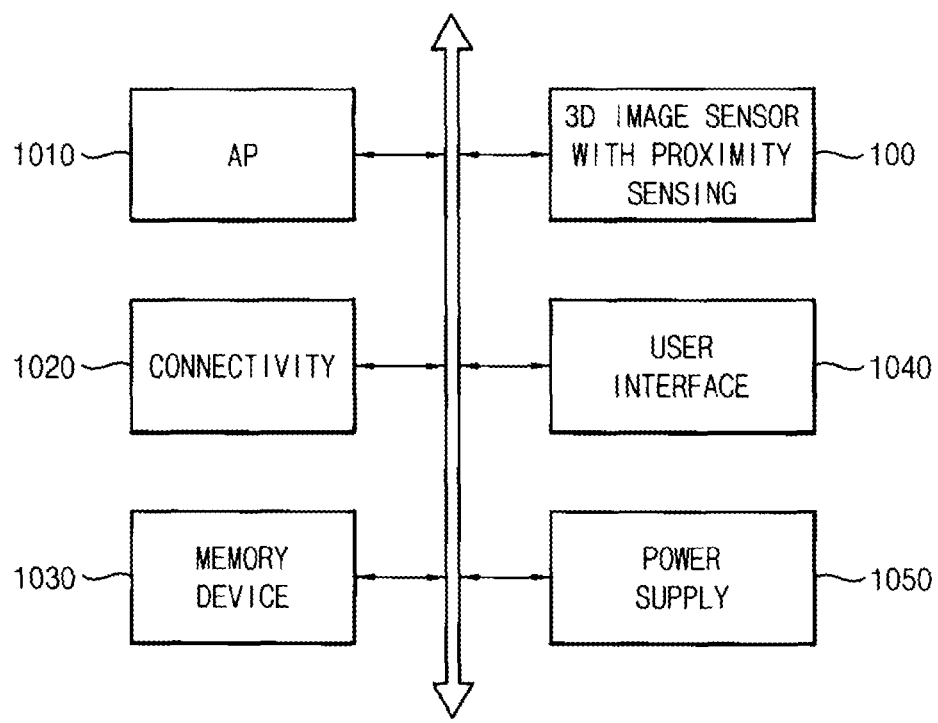
FIG. 2 is a block diagram illustrating an example embodiment of the mobile system shown in FIG. 1.

FIG. 2 is a block diagram illustrating an example of the mobile system shown in FIG. 1.

Referring to FIG. 2, the mobile system 1000 includes an application processor 1010, a connectivity unit 1020, a memory device 1030, the 3D image sensor 100, a user interface 1040, and a power supply 1050. According to some example embodiments, the mobile system 1000 may be a predetermined mobile system, such as a mobile phone, a smart phone, a tablet PC (personal computer), a laptop computer, a PDA (Personal Digital Assistant), a PMP (Portable Multimedia Player), a digital camera, a music player, a portable game console, or a navigation system.

The application processor 1010 may execute an operating system (OS) to operate the mobile system 1000. In addition, the application processor 1010 may execute various applications to provide an Internet browser, a game, and a dynamic image. According to some to example embodiments, the application processor 1010 may include a single core or multi-cores. In addition, according to some example embodiments, the application processor 1010 may further include a cache memory positioned inside or outside the application processor 1010.

The connectivity unit 1020 can make communication with external devices. For instance, the connectivity unit 1020 can perform the USB (Universal Serial Bus) communication, Ethernet communication, NFC (Near Field Communication), RFID (Radio Frequency Identification) communication, mobile telecommunication, or memory card communication. For instance, the connectivity unit 1020 may include a baseband chipset and may support communications, such as GSM (Global System for Mobile Communication), GPRS (General Packet Radio Service), WCDMA (Wideband Code Division Multiple Access), and HSxPA (High Speed Packet Access).

The memory device 1030 may store data processed by the application processor 1010 or may operate as a working memory. In addition, the memory device 1030 may store a bottom image for booting the mobile system 1000, a file system related to the operating system to operate the mobile system 1000, a device driver related to external devices connected to the mobile system 1000, and the applications executed in the mobile system 1000. For instance, the memory device 1030 may include a volatile memory, such as DRAM (Dynamic Random Access Memory), SRAM (Static Random Access Memory), mobile DRAM, DDR (Double Data Rate) SDRAM (Synchronous Dynamic Random Access Memory), LPDDR (Low Power Double Data Rate) SDRAM, GDDR (Graphics Double Data Rate) SDRAM, or RDRAM (Rambus Dynamic Random Access Memory), or may include a nonvolatile memory, such as EEPROM (Electrically Erasable Programmable Read-Only Memory), Flash Memory, PRAM (Phase Change Random Access Memory), RRAM (Resistance Random Access Memory), NFGM (Nano Floating Gate Memory), PoRAM (Polymer Random Access Memory), MRAM (Magnetic Random Access Memory), or FRAM (Ferroelectric Random Access Memory).

The 3D image sensor 100 may perform the first sensing and the second sensing. For instance, the 3D image sensor 100 may primarily perform the first sensing and then consecutively or selectively perform the second sensing based on the result of the first sensing.

The user interface 1040 may include at least one input device, such as a keypad, the buttons 1043 and 1045 (e.g., FIG. 1), or the touch screen 1044 (e.g., FIG. 1), and/or at least one output device, such as the speaker 1048 (see, FIG. 1) or the display device 1041 (e.g., FIG. 1). The power supply 1050 may supply operating voltage to the mobile system 1000.

The mobile system 1000 or components of the mobile system 1000 may be mounted by using various types of packages, such as PoP (Package on Package), BGAs (Ball grid arrays), CSPs (Chip scale packages), PLCC (Plastic Leaded Chip Carrier), PDIP (Plastic Dual In-Line Package), Die in Waffle Pack, Die in Wafer Form, COB (Chip On Board), CERDIP (Ceramic Dual In-Line Package), MQFP (Plastic Metric Quad Flat Pack), TQFP (Thin Quad Flat-Pack), SOIC (Small Outline Integrated Circuit), SSOP (Shrink Small Outline Package), TSOP (Thin Small Outline Package), TQFP (Thin Quad Flat-Pack), SIP (System In Package), MCP (Multi Chip Package), WFP (Wafer-level Fabricated Package), and WSP (Wafer-Level Processed Stack Package).

Figure 3:
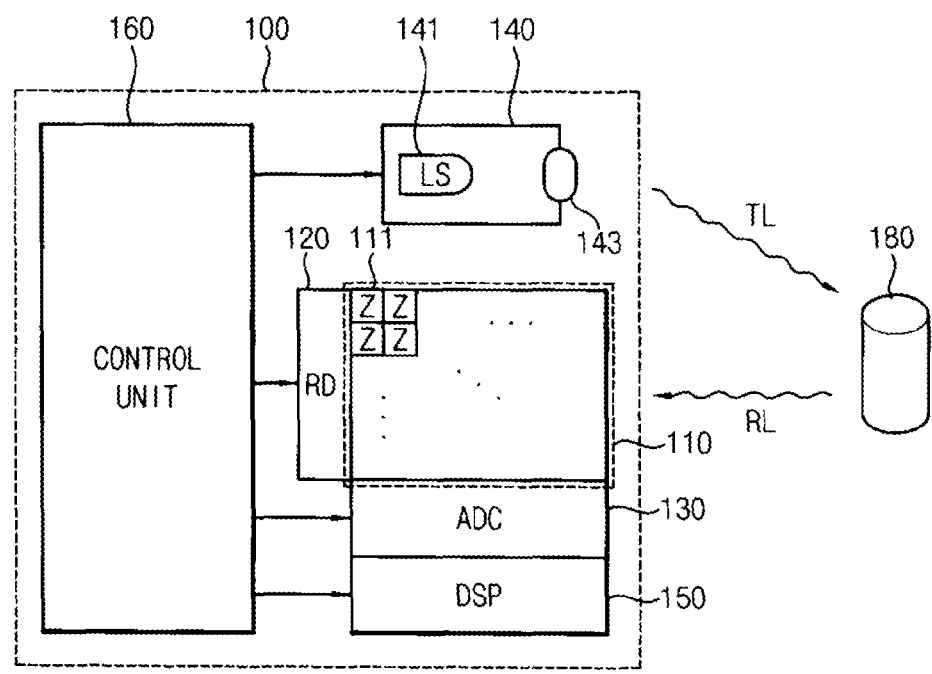
FIG. 3 is a block diagram illustrating an example of a 3D image sensor included in the mobile system shown in FIG. 1.

FIG. 3 is a block diagram illustrating an example of the 3D image sensor 100 included in the mobile system shown in FIG. 1.

Referring to FIG. 3, the 3D image sensor 100 may include a sensing unit 110, an RD (row driving) unit 120, an ADC (Analog-to-Digital Converting) unit 130, a light source unit 140, a DSP (Digital Signal Processing) unit 150, and a control unit 160.

The light source unit 140 may output light TL having a desired wavelength (that may or may not be predetermined; e.g., infrared rays or near-infrared rays). The light source unit 140 may be selectively activated or may emit lights having mutually different brightness according to the operation mode.

The light source unit 140 may include a light source 141 and a lens 143. The light source 141 may generate the light TL. For instance, the light source 141 may be realized as an LED (light emitting diode) or a laser diode. In some example embodiments, the light source 141 may generate light having intensity modulated to be periodically changed. For instance, the intensity of the light TL may be modulated in the form of a pulse wave having continuous pulses, a sine wave, or a cosine wave. In some example embodiments, the light source 141 may generate light having constant intensity, that is, non-modulated light. The lens 143 can concentrate the light TL emitted from the light source 141 onto a subject 180. The waveform of the light TL emitted from the light source unit 140 will be described later with reference to FIGS. 6B, 6C, and 6D.

The sensing unit 110 receives light RL reflected from the subject 180 to convert the light RL into an electric signal. In some example embodiments, the received light RL may be generated based on infrared rays or near-infrared rays TL emitted from the light source unit 140. In some example embodiments, the received light RL may be generated based on infrared rays or near-infrared rays included in ambient light. In some example embodiments, the received light RL may be generated based on visible rays included in the ambient light. In some example embodiments, the received light RL may be generated based on both infrared rays or near-infrared rays and visible rays.

The sensing unit 110 may include a plurality of depth pixels 111. All or part of the depth pixels 111 may be activated according to the operation mode. The depth pixels 111 are aligned in the form of a pixel array and provide information about the distance between the 3D image sensor 100 and the subject 180. For instance, an infrared filter or a near-infrared filter may be formed on the depth pixels 111.

The row driving unit 120 is connected to each row of the sensing unit 110 to generate a driving signal to drive each row. For instance, the row driving unit 120 can drive the depth pixels 111, which are included in the sensing unit 110, in a unit of row.

The ADC unit 130 is connected to each column of the sensing unit 110 to convert an analog signal output from the sensing unit 110 into a digital signal. In some example embodiments, the ADC unit 130 includes a plurality of analog-digital converters and can perform the column ADC to convert the analog signals output from each column line into the digital signals in parallel (that is, concurrently). In some example embodiments, the ADC unit 130 includes a single analog-digital converter and can perform the single ADC to sequentially convert the analog signals into the digital signals.

According to some example embodiments, the ADC unit 130 may include a CDS (Correlated Double Sampling) unit to extract effective signal components. In some example embodiments, the CDS unit may perform the analog double sampling to extract the effective signal components based on difference between an analog reset signal representing a reset component and an analog data signal representing a signal component. In some example embodiments, the CDS unit may perform the digital double sampling to extract the effective signal components based on difference between two digital signals after converting the analog reset signal and the analog data signal into the two digital signals. In some example embodiments, the CDS unit may perform the dual correlated double sampling by performing both of the analog double sampling and the digital double sampling.

The DSP unit 150 receives the digital signal output from the ADC unit 130 to perform the image data processing with respect to the digital signal. For instance, the DSP unit 150 may perform the image interpolation, color correction, white balance, gamma corrections, and color conversion.

The control unit 160 may control the row driving unit 120, the ADC unit 130, the light source unit 140, and the DSP unit 150. The control unit 160 may supply control signals, such as clock signals and timing control signals required to operate the row driving unit 120, the ADC unit 130, the light source unit 140, and the DSP unit 150. In some example embodiments, the control unit 160 may include a logic control circuit, a PLL (Phase Lock Loop) circuit, a timing control circuit, and a communication interface circuit.

FIG. 4 is a flowchart illustrating a method of operating the image sensor according to some example embodiments. The method of operating the image sensor illustrated in FIG. 4 may be applied to operate the 3D image sensor 100 installed in the mobile system 1000 to perform the proximity sensing and the motion recognition. FIGS. 5A, 5B, 5C, 6A, 6B, 6C, and 6D are views illustrating a method of operating the image sensor shown in FIG. 4. For the purpose of convenience of illustration, only the 3D image sensor 100 and the display device 1041 are illustrated in the mobile system in FIGS. 5A, 5B, 5C, and 6A.

Figure 5A:
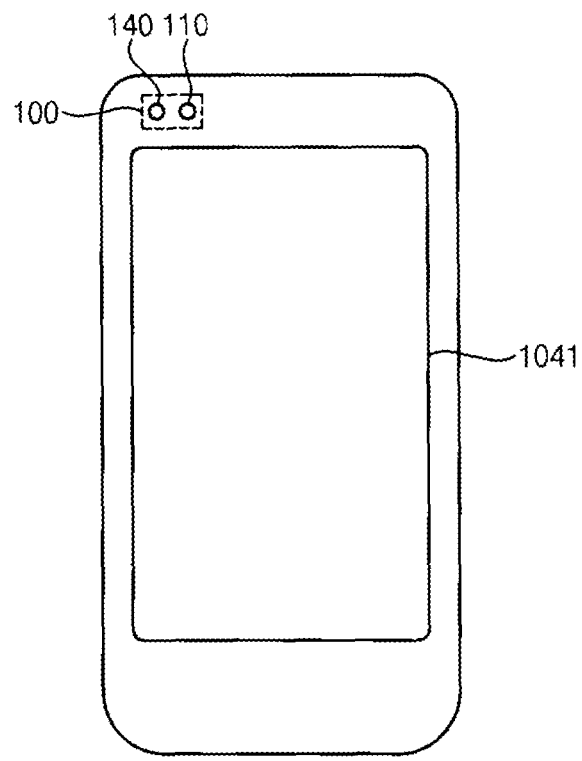
FIGS. 5A, 5B, 5C, 6A, 6B, 6C, and 6D are views illustrating a method of operating the image sensor shown in FIG. 4.

Referring to FIGS. 1, 4, 5A, 5B, 5C, 6A, 6B, 6C, and 6D, in order to operate the 3D image sensor 100, it is determined whether a trigger signal is activated (operation S110). For instance, as shown in FIG. 5A, the mobile system 1000 and the 3D image sensor 100 are inactivated in the early stage of operation. If the user activates the mobile system 1000 by pressing the power button 1043 or the mobile system 1000 is ready to operate soon, that is, when another user sends a call to the mobile system 1000 in case the mobile system 1000 is a portable phone or a smart phone, the trigger signal may be activated.

If the trigger signal is inactivated (operation S110: NO), the 3D image sensor 100 waits for activation of the trigger signal.

Figure 5B:
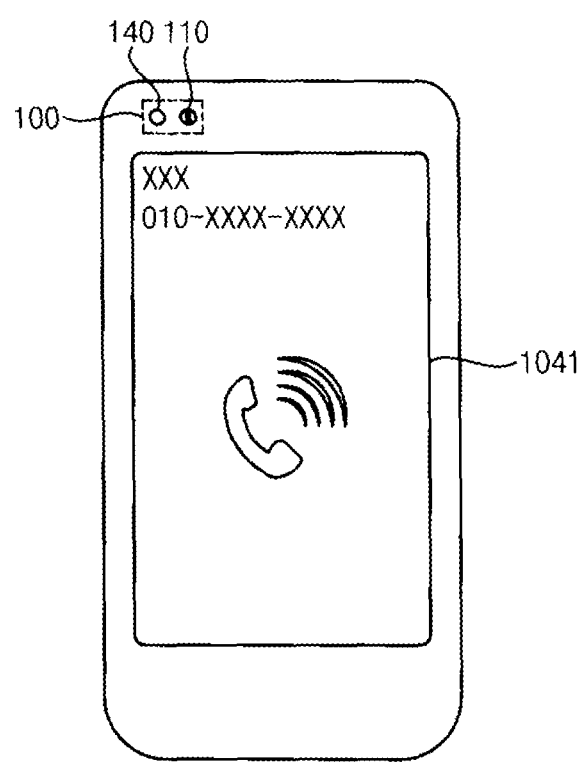

If the trigger signal is activated (operation S110: YES), the first operation mode (for instance, proximity sensing mode) is activated. The 3D image sensor 100 performs the first sensing to detect proximity of the subject (operation S120). For instance, as shown in FIG. 5B, when another user send a call, the trigger signal is activated and the first operation mode is activated so that the first sensing may be performed. In the example embodiment shown in FIG. 5B, if the operation mode is activated, the light source unit 140 may be inactivated so that the light may not be emitted. In addition, only some depth pixels included in the sensing unit 110, for instance, only first depth pixels adjacent to each other may be activated. The first sensing is performed based on the activated first depth pixels, and the activated first depth pixels may provide information about proximity of the subject based on infrared rays or near-infrared rays included in ambient light. For instance, the first depth pixels are all or part of the depth pixels disposed in one row or one column among the depth pixels included in the sensing unit 110.

The proximity of the subject is determined based on the first sensing (operation S130). For instance, quantity of infrared rays or near-infrared rays incident into the sensing unit 110 when the subject is not proximate to the 3D image sensor 100 (that is, when a distance between the subject and the 3D image sensor 100 is longer than a reference distance) may be different from quantity of infrared rays or near-infrared rays incident into the sensing unit 110 when the subject is proximate to the 3D image sensor 100 (that is, when a distance between the subject and the 3D image sensor 100 is shorter than a reference distance). The activated first depth pixels can provide information about the proximity of the subject by detecting variation in quantity of infrared rays or near-infrared rays incident into the sensing unit 110.

If it is determined that the subject is not proximate to the 3D image sensor 100 (operation S130: NO), the 3D image sensor 100 keeps on performing the first sensing.

Figure 5C:
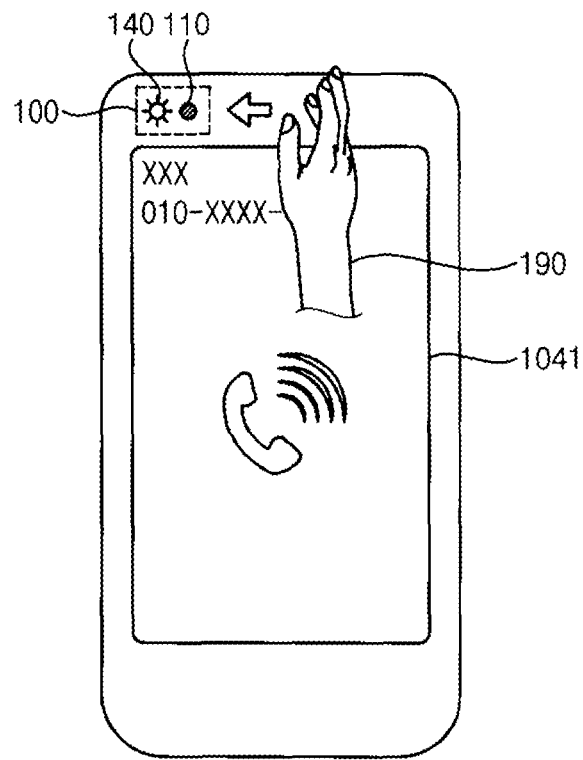

If it is determined that the subject is proximate to the 3D image sensor 100 (operation S130: YES), the second operation mode (for instance, 3D operation mode or depth mode) is activated. The 3D image sensor 100 acquires information about the distance of the subject and performs the second sensing to recognize the motion of the subject (operation S140). For instance, as shown in FIG. 5C, if the subject 180 is proximate to the 3D image sensor 100 while a call from another user is being received, the second operation mode may be activated. In the example embodiment of FIG. 5C, when the second operation mode is activated, the light source unit 140 is activated so that the light source unit 140 may emit the light (for instance, high-brightness light). In addition, all of the depth pixels included in the sensing unit 110 may be activated. The second sensing may be performed based on the activated depth pixels. The activated depth pixels may provide information about the distance and motion of the subject based on reflective light, which is reflected from the subject after emitted from the light source unit 140.

The mobile system 1000 performs the target operation based on the second sensing (operation S150). For instance, the target operation may be one of various operations, such as selection or execution of menus and/or applications based on the motion recognition (for instance, 3D interface operation), execution of the function intended by the user on the executed menu and/or application based on the motion recognition (for instance, 3D application operation such as game manipulation or play of multimedia file), and photographing of 3D images (for instance, 3D photographing operation).

Figure 6A:
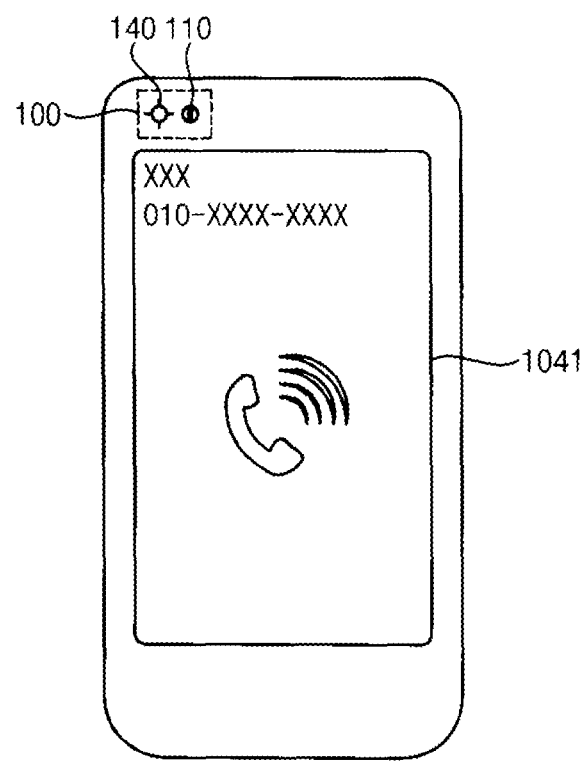

Meanwhile, different from the example embodiment of FIG. 5B, the light source unit 140 may be activated when the first operation mode is activated. For instance, as shown in FIG. 6A, when a call from another user is received, the trigger signal may be activated and the first operation mode may be activated. In the example embodiment of FIG. 6A, if the first operation mode is activated, the light source unit 140 is activated so that the light source unit 140 may emit the light (for instance, low-brightness light). In addition, only the first depth pixels among the depth pixels included in the sensing unit 110 may be activated and the first sensing may be performed based on the activated first depth pixels. The activated first depth pixels may provide information about the proximity of the subject based on reflective light, which is reflected from the subject after emitted from the light source unit 140.

Figure 6B:
Figure 6C:
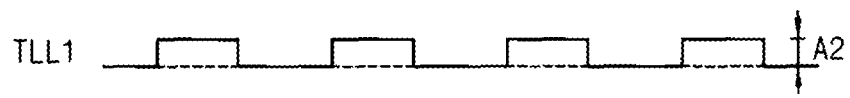
Figure 6D:
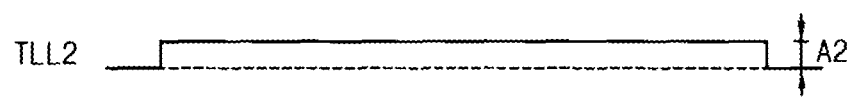

If the light source unit 140 is activated in both of the first operation mode and the second operation mode, the light source unit 140 may emit the lights having mutually different brightness based on the operation mode. For instance, as shown in FIG. 6B, the light source unit 140 may emit high-brightness light TLH in the second operation mode where the second sensing is performed. The high-brightness light TLH has brightness corresponding to amplitude A1 and may be modulated such that intensity thereof can be periodically changed (to have continuous pulses like a pulse wave). In some example embodiments, as shown in FIG. 6C, the light source unit 140 may emit low-brightness light TLL1 in the first operation mode where the first sensing is performed. The low-brightness light TLL1 has brightness corresponding to amplitude A2 and may be modulated such that intensity thereof can be periodically changed. In some example embodiments, as shown in FIG. 6D, the light source unit 140 may emit low-brightness light TLL2 in the first operation mode where the first sensing is performed. The low-brightness light TLL2 has brightness corresponding to amplitude A2 and constant intensity without modulation so that power consumption of the 3D image sensor 100 and the mobile system 1000 can be more reduced in the first operation mode.

Meanwhile, as will be described later with reference to FIGS. 7A, 7B, 10A, 10B, 12A, and 12B, if it is determined that the subject is proximate to the 3D image sensor 100 (operation S130: YES), the 3D image sensor 100 may selectively perform the second sensing.

In addition, according to some example embodiments, the method of operating the 3D image sensor 100 shown in FIG. 4 may be applicable for operating the mobile system 1000 including the 3D image sensor 100.

Figure 7A:
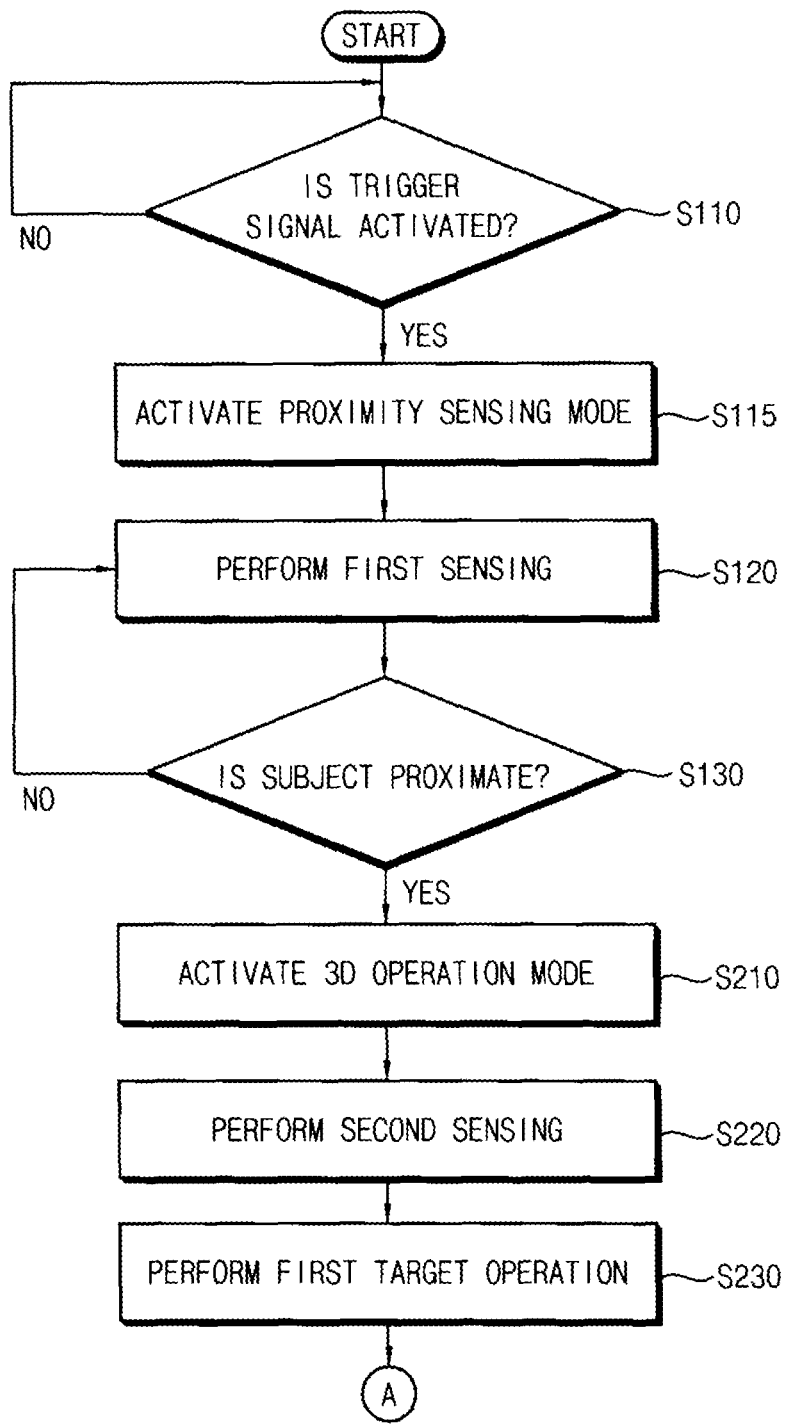
FIGS. 7A and 7B are flowcharts illustrating a method of operating a mobile system according to some example embodiments.
Figure 7B:
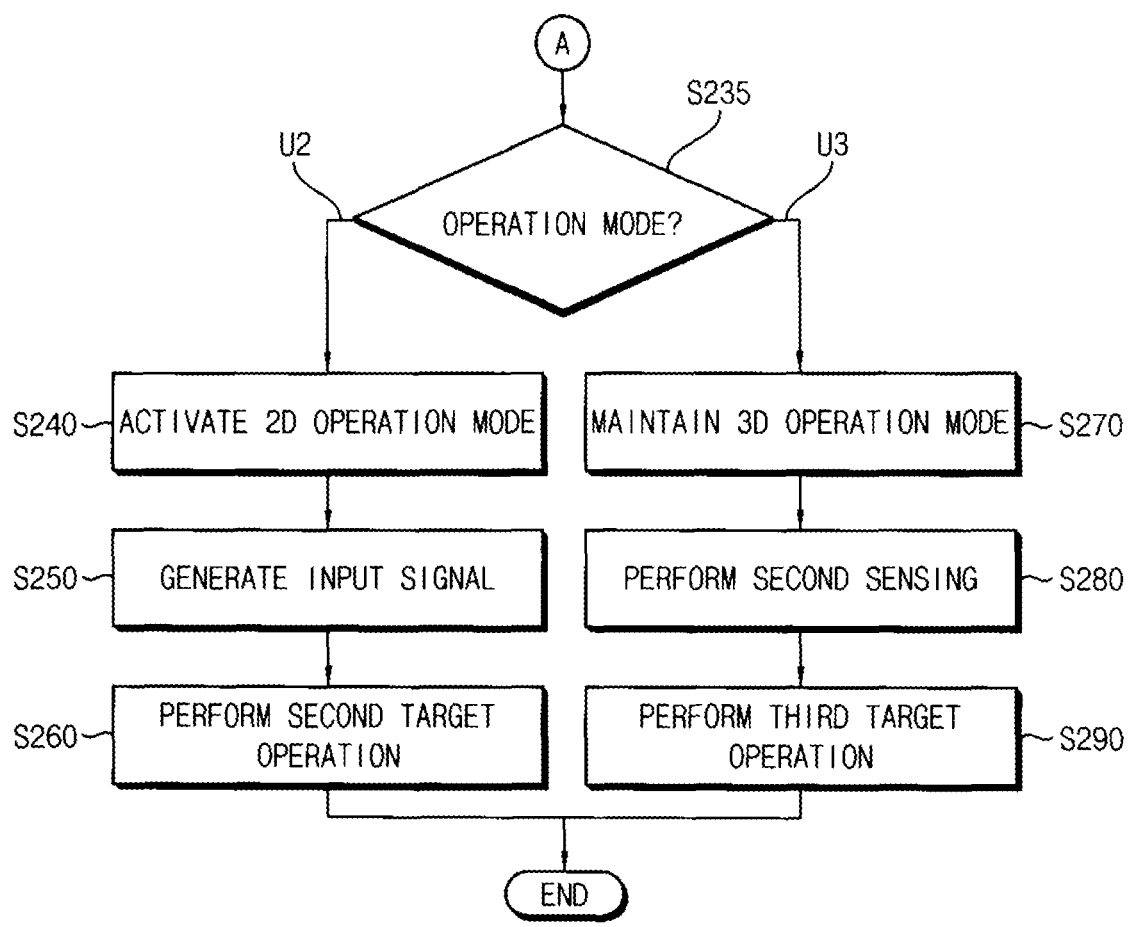

FIGS. 7A and 7B are flowcharts illustrating a method of operating a mobile system 1000 according to some example embodiments. The method of operating the mobile system illustrated in FIGS. 7A and 7B may be applied to operate the mobile system 1000 including the 3D image sensor 100 that performs the proximity sensing and motion recognition and input devices such as the touch screen 1044 and the buttons 1043 and 1045. FIGS. 8A, 8B, 8C, 8D, and 8E are views to explain the method of operating the mobile system shown in FIGS. 7A and 7B. For the purpose of convenience of illustration, only the 3D image sensor 100, the display device 1041, the power button 1043, and the touch screen 1044 are illustrated in the mobile system in FIGS. 8A, 8B, 8C, 8D, and 8E.

Figure 8A:
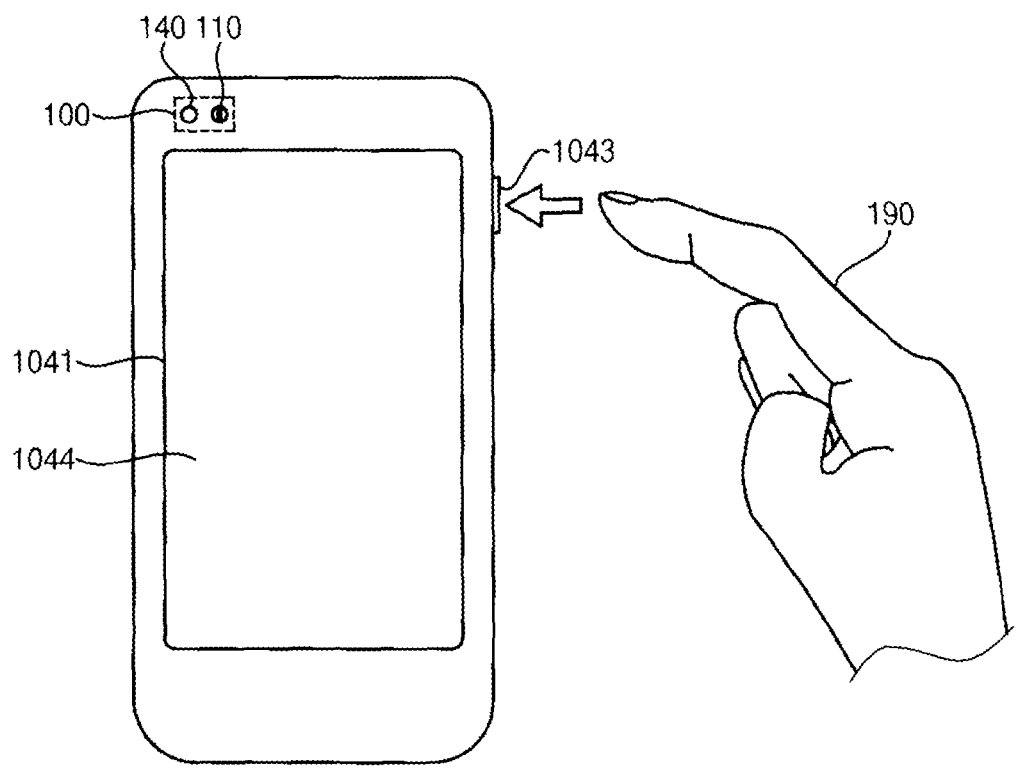
FIGS. 8A, 8B, 8C, 8D, and 8E are views to explain a method of operating the mobile system shown in FIGS. 7A and 7B.

Referring to FIGS. 1, 7A, 7B, 8A, 8B, 8C, 8D, and 8E, in order to operate the mobile system 1000, it is determined whether a trigger signal is activated (operation S110). If the trigger signal is inactivated (operation S110: NO), the mobile system 1000 waits for activation of the trigger signal. If the trigger signal is activated (operation S110: YES), the first operation mode (for instance, proximity sensing mode) is activated (operation S115) and the first sensing is performed (operation S120). For instance, as shown in FIG. 8A, if the user presses the power button 1043, the trigger signal is activated and the first operation mode is activated so that the first sensing may be performed. The proximity of the subject is determined based on the first sensing (operation S130). Operations S110, S120, and S130 may be substantially identical to operations S110, S120, and S130 shown in FIG. 4.

If it is determined that the subject is not proximate to the 3D image sensor 100 (operation S130: NO), the 3D image sensor 100 keeps on performing the first sensing.

Figure 8B:
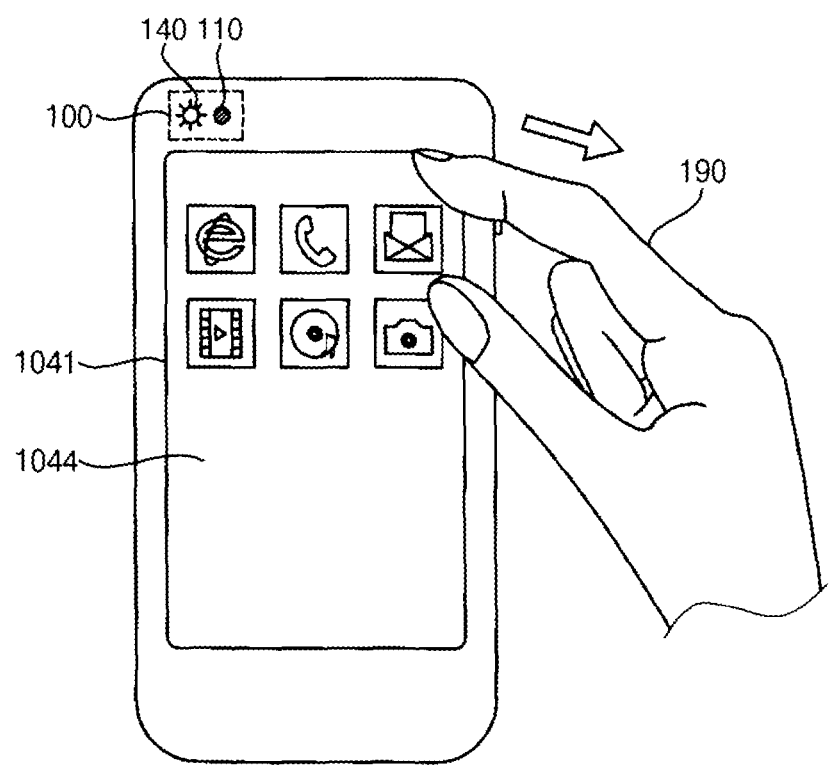

If it is determined that the subject is proximate to the 3D image sensor 100 (operation S130: YES), the second operation mode (for instance, 3D operation mode) is activated (operation S210). The 3D image sensor 100 acquires information about the distance of the subject and performs the second sensing to recognize the motion of the subject (operation S220). The mobile system 1000 performs the first target operation based on the second sensing (operation S230). For instance, when the subject 180 is proximate to the 3D image sensor 100, as shown in FIGS. 8A and 8B, a screen to select a menu and/or an application is displayed on the display device 1041 and the 3D operation mode is activated. The light source unit 140 is activated so that the light source unit 140 may emit the light (for instance, high-brightness light). In addition, all of the depth pixels included in the sensing unit 110 may be activated. The 3D image sensor 100 may perform the second sensing to recognize the motion of the subject 180 that picks up or clicks a menu icon and/or an application icon in a space. The mobile system 1000 may select or execute the menu and/or the application based on the second sensing. That is, the first target operation may be the 3D interface operation to select or execute the menu and/or the application based on the second sensing.

The operation mode of the mobile system 1000 may be changed or not based on the first target operation.

Figure 8C:
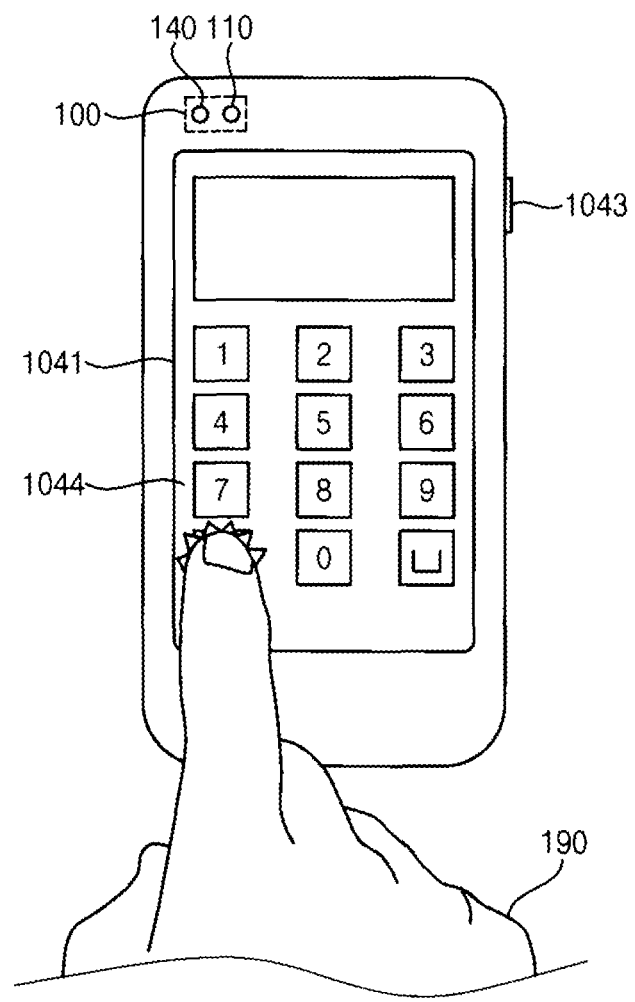

As a result of the first target operation, if the operation using the input device, such as the touch screen 1044 and the buttons 1043 and 1045, is required (operation S235: U2), the third operation mode (for instance, 2D operation mode) is activated (operation S240). The input device generates the input signal based on the user's input (operation S250). The mobile system 1000 performs the second target operation based on the input signal (operation S260). For instance, as shown in FIG. 8C, when a text application is selected, a text input screen is displayed on the display device 1041 as shown in FIG. 8C and the 2D operation mode may be activated. The touch screen 1044 may generate the input signal based on the touch event, such as a contact of a user's finger 190 to the touch screen 1044. The mobile system 1000 may input the text based on the input signal. In detail, the second target operation may refer to the operation to perform the function intended by the user on the executed menu and/or application by using the input device (for instance, 2D application operation such as text input). Meanwhile, in the third operation mode, the light source unit 140 and the depth pixels included in the sensing unit 110 may be inactivated.

Figure 8D:
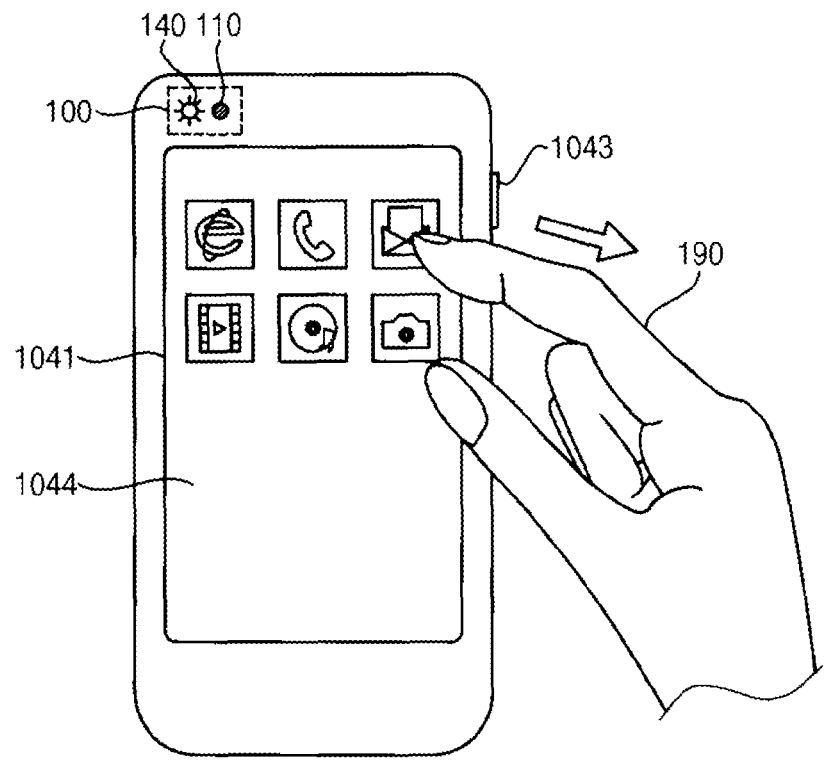
Figure 8E:
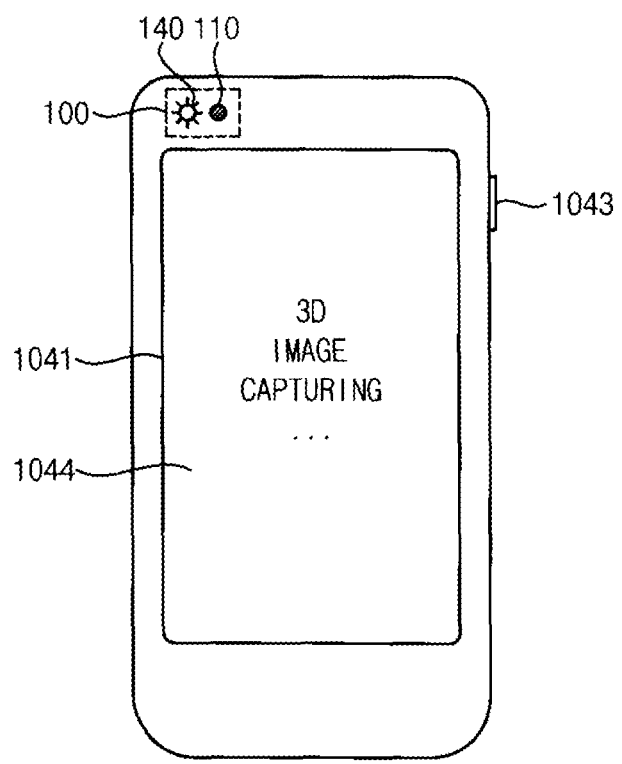

As a result of the first target operation, if the second sensing is still required (operation S235: U3), the second operation mode is maintained (operation S270). The 3D image sensor 100 performs the second sensing (operation S280). The mobile system 1000 performs the third target operation based on the second sensing (operation S290). For instance, if a camera application is selected as shown in FIG. 8D, the 3D image sensor 100 can photograph a 3D image by performing the second sensing as shown in FIG. 8E. That is, the third target operation may refer to the 3D photographing operation to photograph the 3D image. According to some example embodiments, the third target operation may be the 3D application operation to perform the function intended by the user based on the motion recognition or may be the 3D interface operation substantially identical to the first target operation. Meanwhile, the light source unit 140 and the depth pixels included in the sensing unit 110 may be kept activated.

In the example embodiment of FIGS. 7A and 7B, if it is determined that the subject is proximate to the 3D image sensor 100, the 3D operation mode is activated and the operation mode of the mobile system 1000 may be kept in the 3D operation mode or changed into the 2D operation mode from the 3D operation mode based on the 3D interface operation which is performed in the 3D operation mode.

Meanwhile, although not shown in the drawings, power consumption of the 3D image sensor 100 and the mobile system 1000 can be more reduced by performing the second sensing in operation S220 based on the depth pixels constituting the partial array.

Figure 9A:
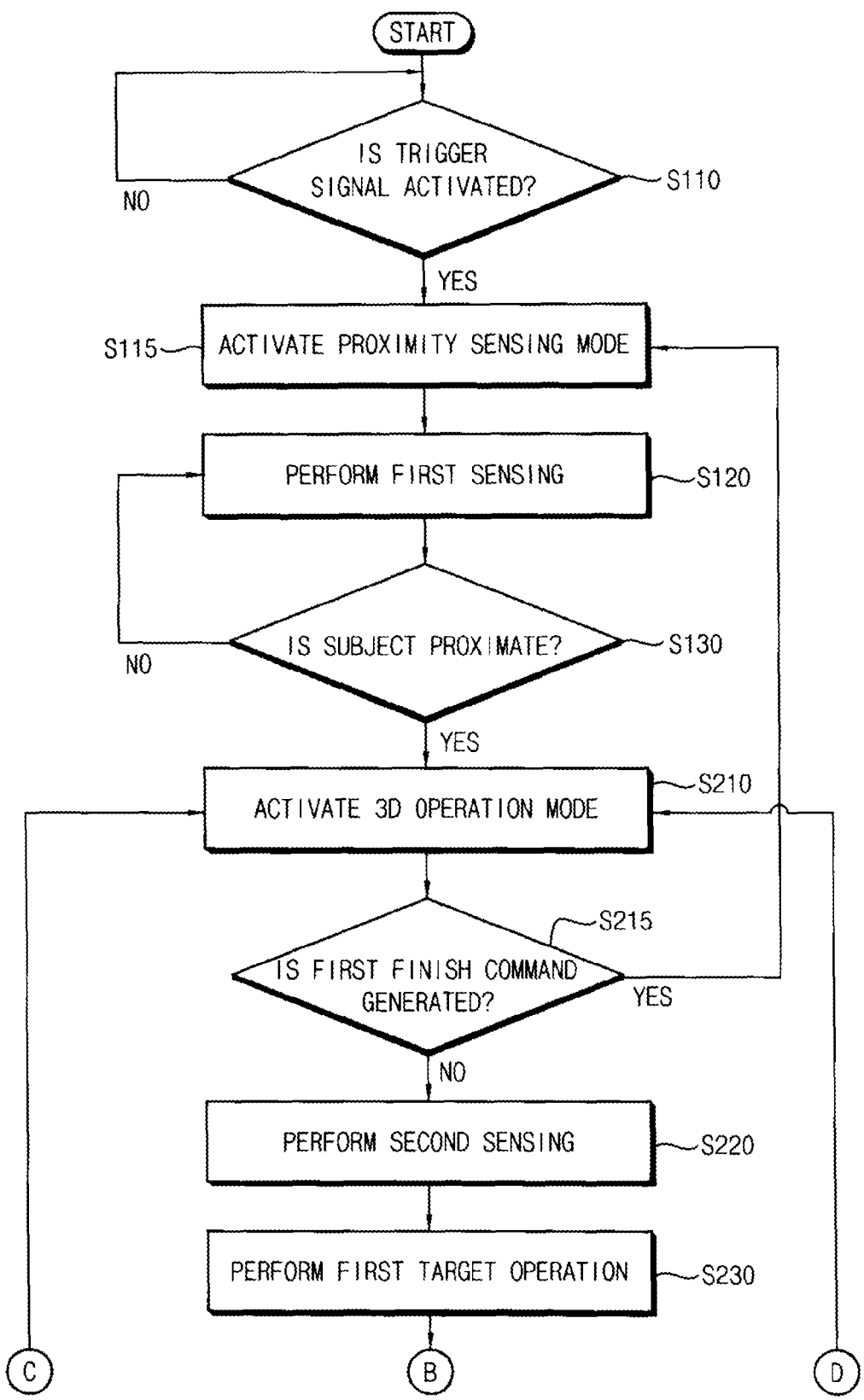

FIGS. 9A and 9B are flowcharts illustrating a method of operating the mobile system 1000 according to some example embodiments.

Referring to FIGS. 9A and 9B, when comparing with FIGS. 7A and 7B, operations S215, S265, and S295 are additionally performed to operate the mobile system 1000. Operations S110, S115, S120, S130, S210, S220, S230, S240, S250, S260, S270, S280, and S290 of FIGS. 9A and 9B may be substantially identical to operations S110, S115, S120, S130, S210, S220, S230, S240, S250, S260, S270, S280, and S290 of FIGS. 7A and 7B, respectively, so redundant description thereof will be omitted.

After the second operation mode is activated (operation S210), it is determined whether the first finish command is generated (operation S215). If the first finish command is not generated (operation S215: NO), the 3D image sensor 100 performs the second sensing (operation S220). If the first finish command is generated (operation S215: YES), the second operation mode is finished and the first operation mode is again activated (operation S115). For instance, the screen for selecting or executing the menu and/or application as shown in FIGS. 8B and 8D disappears, the motion recognition is finished, and the proximity sensing is again performed.

After the second target operation has been performed (operation S260), it is determined whether the second finish command is generated (operation S265). If the second finish command is not generated (operation S265: NO), the mobile system waits for the user's input. If the user's input is generated, the input signal is generated (operation S250) and the second target operation is performed (operation S260) and this process is repeated. If the second finish command is generated (operation S265: YES), the third operation mode is finished and the second operation mode is again activated (operation S210). For instance, the screen for inputting the text as shown in FIG. 8C disappears, the screen for selecting or executing the menu and/or application as shown in FIGS. 8B and 8D is displayed and the motion recognition is performed again for 3D interface operation.

After the third target operation has been performed (operation S290), it is determined whether the third finish command is generated (operation S295). If the third finish command is not generated (operation S295: NO), the mobile system waits for the motion of the subject. If the motion of the subject is detected, the second sensing is performed (operation S280) and the third target operation is performed (operation S290) and this process is repeated. If the third finish command is generated (operation S295: YES), the process returns to operation S210 so that the second operation mode is again activated. For instance, the image photographing screen as shown in FIG. 8E disappears, the screen for selecting or executing the menu and/or application as shown in FIGS. 8B and 8D is displayed and the motion recognition is performed again for 3D interface operation.

Figure 10A:
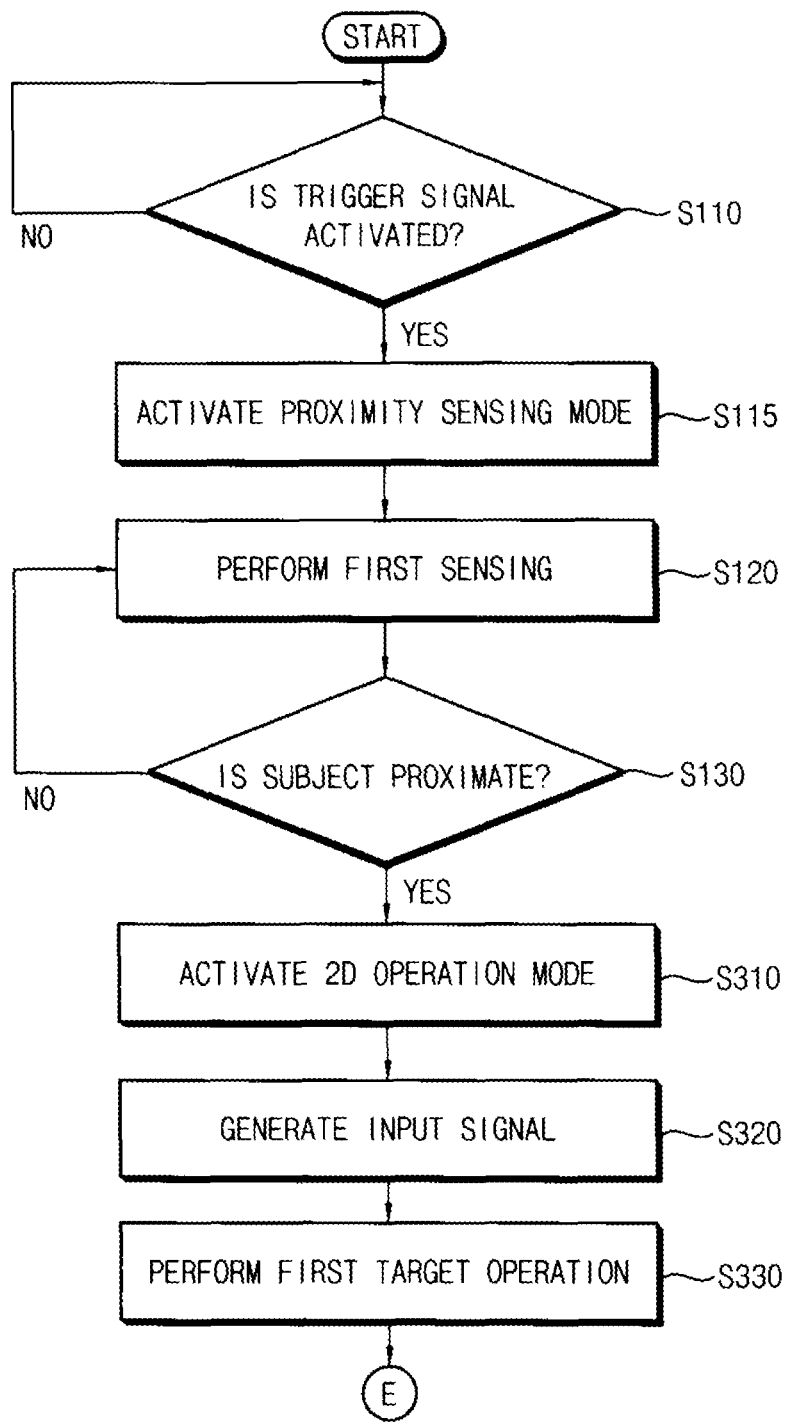
FIGS. 10A and 10B are flowcharts illustrating a method of operating a mobile system according to some example embodiments.
Figure 10B:
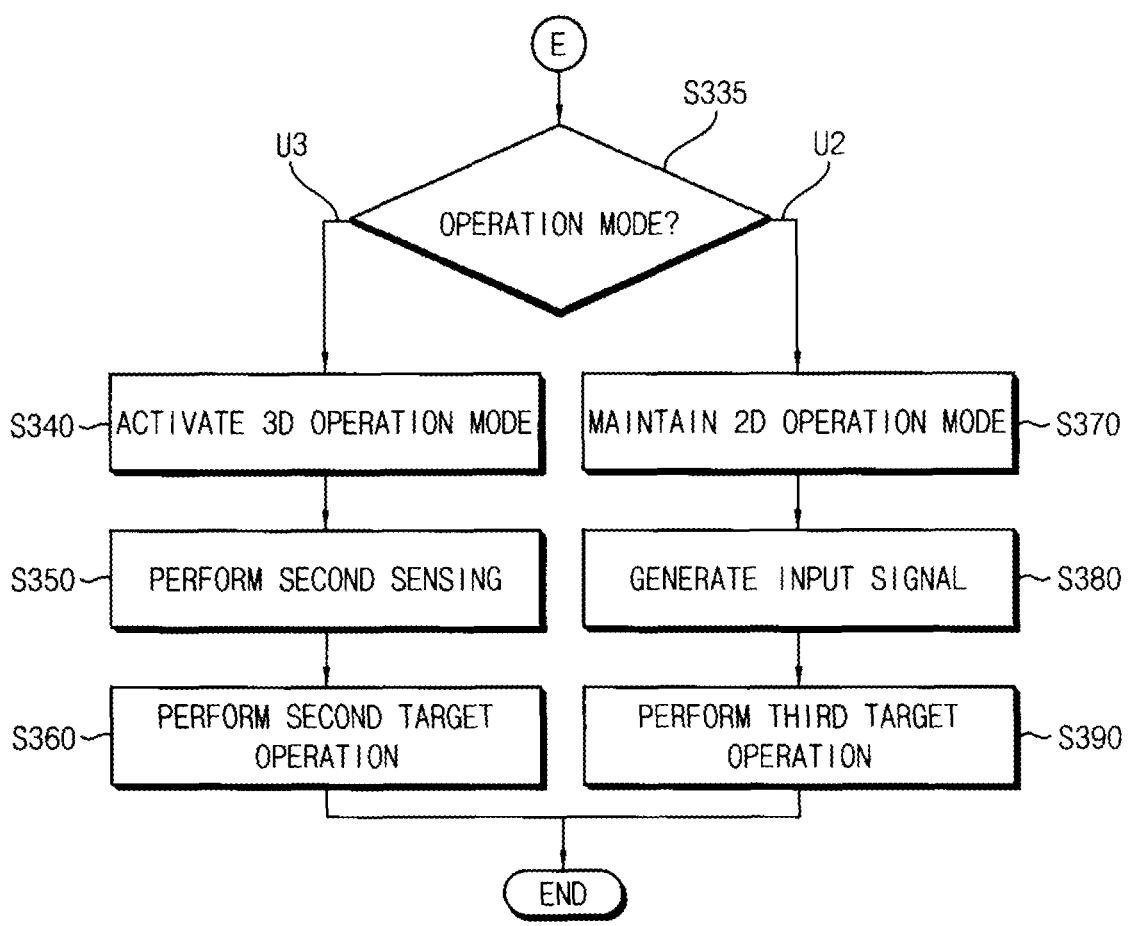
Figure 11A:
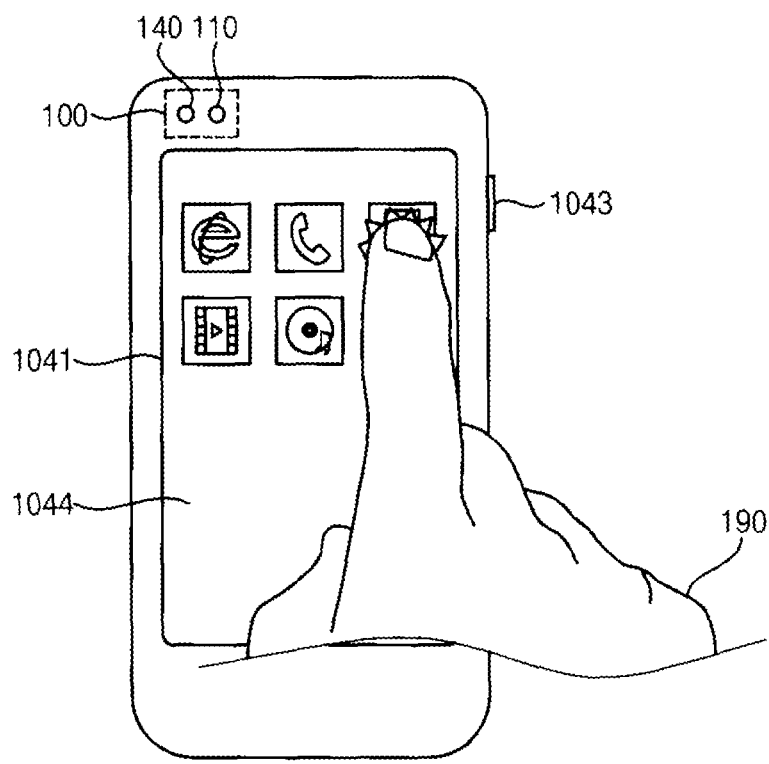
FIGS. 11A and 11B are views to explain a method of operating a mobile system shown in FIGS. 10A and 10B.
Figure 11B:
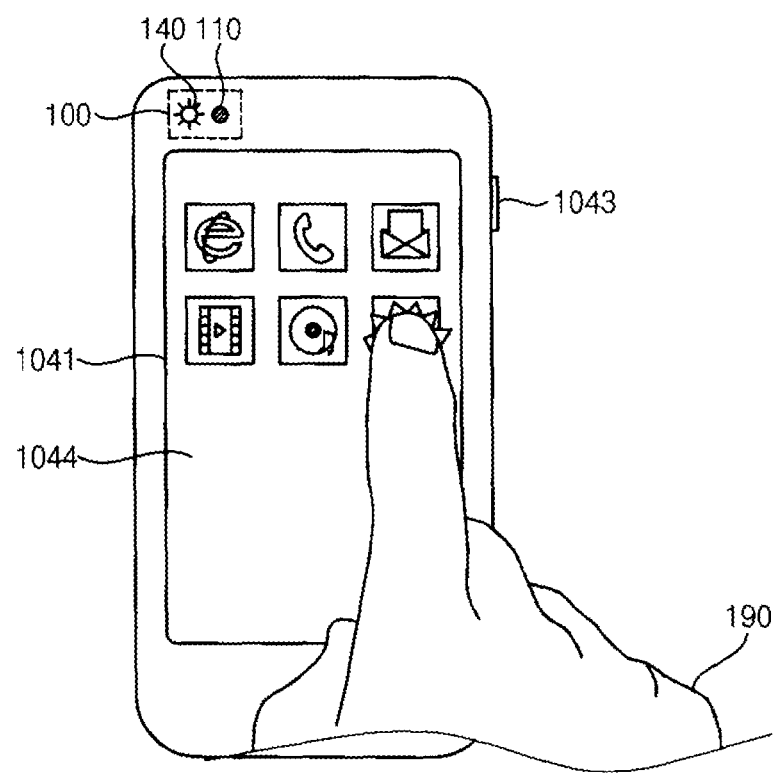

FIGS. 10A and 10B are flowcharts illustrating a method of operating the mobile system 1000 according to some example embodiments. The method of operating the mobile system illustrated in FIGS. 10A and 10B may be applied to operate the mobile system 1000 including the 3D image sensor 100 and input devices. FIGS. 11A and 11B are views to explain a method of operating the mobile system shown in FIGS. 10A and 10B. For the purpose of convenience of illustration, only the 3D image sensor 100, the display device 1041, the power button 1043 and the touch screen 1044 are illustrated in the mobile system in FIGS. 11A and 11B.

Referring to FIGS. 1, 10A, 10B, 11A, and 11B, in order to operate the mobile system 1000, it is determined whether a trigger signal is activated (operation S110). If the trigger signal is inactivated (operation S110: NO), the mobile system 1000 waits for activation of the trigger signal. If the trigger signal is activated (operation S110: YES), the first operation mode (for instance, proximity sensing mode) is activated (operation S115), the first sensing is performed (operation S120) and proximity of the subject is determined (operation S130). Operations S110, S115, S120, and S130 may be substantially identical to operations S110, S115, S120, and S130 shown in FIG. 7A.

If it is determined that the subject is proximate to the 3D image sensor 100 (operation S130: YES), the third operation mode (for instance, 2D operation mode) is activated (operation S310). The input device, such as the touch screen 1044 and the buttons 1043 and 1045, generates the input signal based on the user's input (operation S320). The mobile system 1000 performs the first target operation based on the second sensing (operation S330). For instance, when the subject 180 is proximate to the 3D image sensor 100, as shown in FIGS. 11A and 11B, a screen to select a menu and/or an application is displayed on the display device 1041 and the 2D operation mode is activated. The touch screen 1044 may generate the input signal based on the touch event, such as a contact of a user's finger 190 to the touch screen 1044. The mobile system 1000 may select or execute the menu and/or application based on the input signal. That is, the first target operation may refer to the operation (for instance, 2D interface operation) to select or execute the menu and/or application by using the input device. Meanwhile, in the third operation mode, the light source unit 140 and the depth pixels included in the sensing unit 110 may be inactivated.

The operation mode of the mobile system 1000 may be changed or not based on the first target operation (operation S335).

As a result of the first target operation, if the second sensing is required (operation S335: U3), the second operation mode (for instance, 3D operation mode) is activated (operation S340). The 3D image sensor 100 performs the second image sensing (operation S280). The mobile system 1000 performs the second target operation based on the second sensing (operation S360). For instance, as shown in FIG. 11B, if the camera application is selected, the 3D operation mode may be activated. In the 3D operation mode, the light source unit 140 is activated to emit light (for instance, high-brightness light) and all of the depth pixels included in the sensing unit 110 may be activated. The 3D image sensor 100 can photograph 3D image by performing the second sensing as shown in FIG. 8E. That is, the second target operation may refer to the 3D photographing operation to photograph the 3D image. According to example embodiments, the second target operation may be the 3D application operation to perform the function intended by the user based on the motion recognition.

As a result of the first target operation, if the operation by the input device is still required (operation S335: U2), the third operation mode (for instance, 2D operation mode) is activated (operation S370). The input device generates the input signal based on the user's input (operation S380). The mobile system 1000 performs the third target operation based on the input signal (operation S390). For instance, as shown in FIG. 11A, when a text application is selected, a text input screen is displayed on the display device 1041 as shown in FIG. 8C. The touch screen 1044 may generate the input signal based on the touch event and the mobile system 1000 may input the text based on the input signal. In detail, the third target operation may refer to the 2D application operation to perform the function intended by the user. According to some example embodiments, the third target operation may be the 2D interface operation substantially identical to the first target operation. Meanwhile, the light source unit 140 and the depth pixels included in the sensing unit 110 may be kept inactivated.

In the example embodiment of FIGS. 10A and 10B, if it is determined that the subject is proximate to the 3D image sensor 100, the 2D operation mode is activated and the operation mode of the mobile system 1000 may be kept in the 2D operation mode or changed into the 3D operation mode from the 2D operation mode based on the 2D interface operation which is performed in the 2D operation mode.

Although not shown in FIGS. 10A and 10B, in order to operate the mobile system 1000, similarly to the example embodiment of FIGS. 9A and 9B, an operation of determining whether the first finish command is generated, an operation of determining whether the second finish command is generated, and an operation of determining whether the third finish command is generated may be added.

Figure 12A:
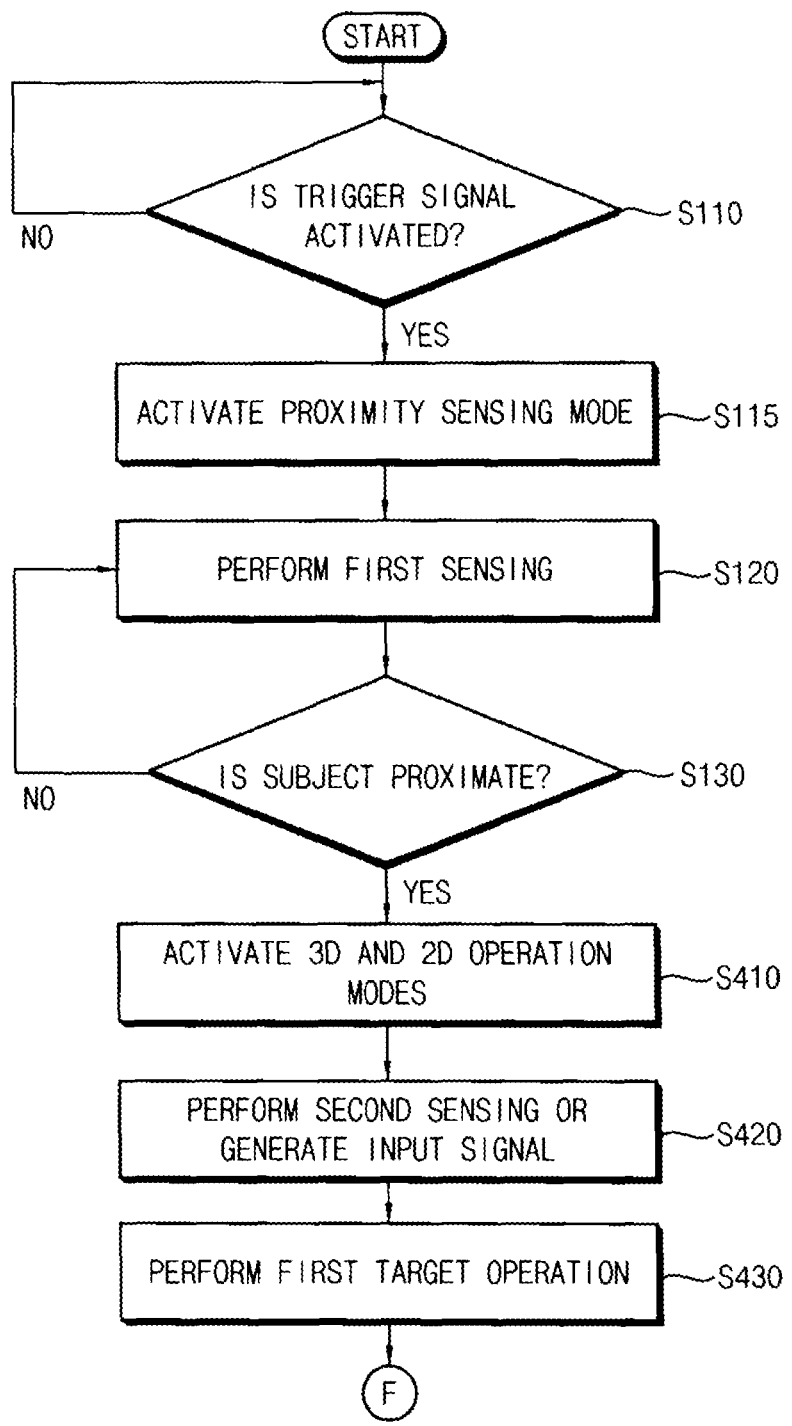
FIGS. 12A and 12B are flowcharts illustrating a method of operating a mobile system according to some example embodiments.
Figure 12B:
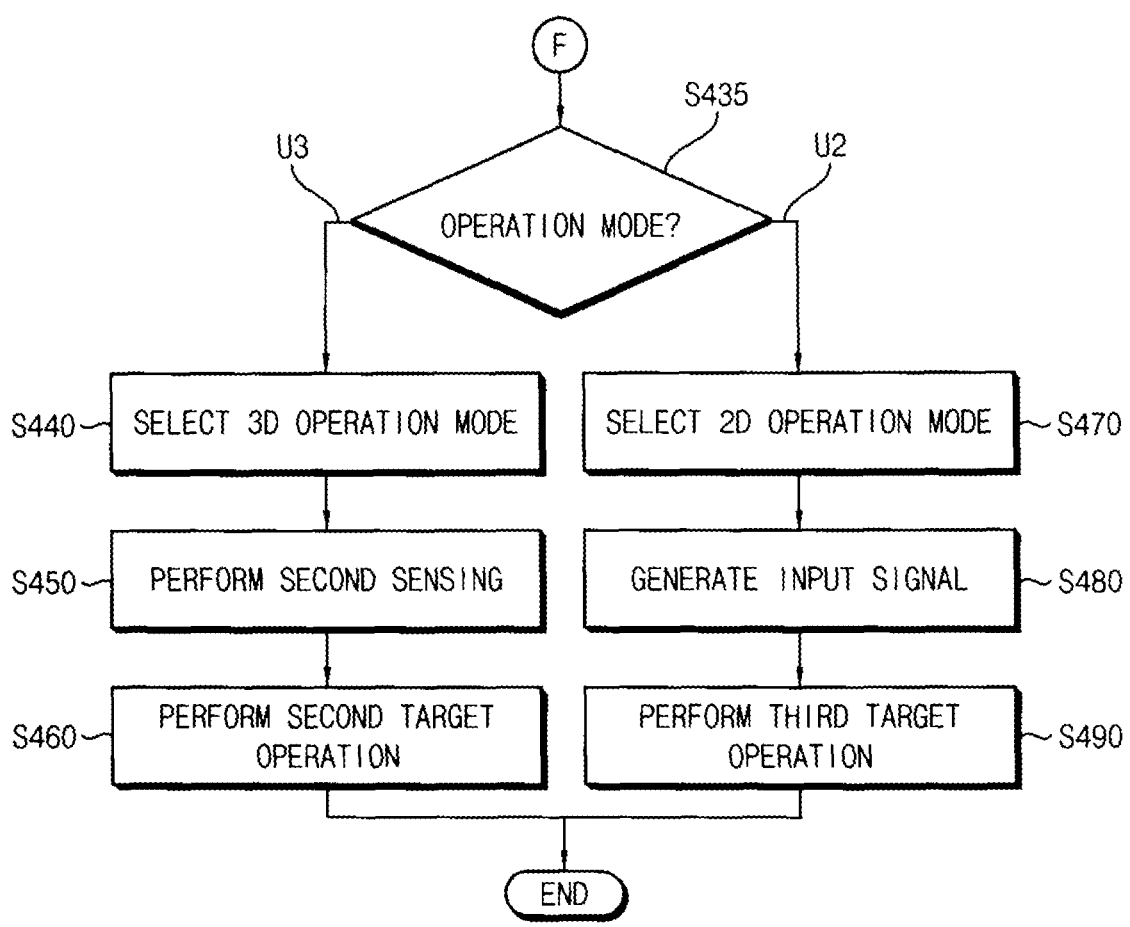

FIGS. 12A and 12B are flowcharts illustrating a method of operating the mobile system 1000 according to some example embodiments. The method of operating the mobile system illustrated in FIGS. 12A and 12B may be applied to operate the mobile system 1000 including the 3D image sensor 100 and input devices.

Referring to FIGS. 1, 12A, and 12B, in order to operate the mobile system 1000, it is determined whether a trigger signal is activated (operation S110). If the trigger signal is inactivated (operation S110: NO), the mobile system 1000 waits for activation of the trigger signal. If the trigger signal is activated (operation S110: YES), the first operation mode (for instance, proximity sensing mode) is activated (operation S115), the first sensing is performed (operation S120) and proximity of the subject is determined (operation S130). Operations S110, S115, S120, and S130 may be substantially identical to operations S110, S115, S120, and S130 shown in FIG. 7A.

If it is determined that the subject is proximate to the 3D image sensor 100 (operation S130: YES), the second operation mode (for instance, 3D operation mode) and the third operation mode (for instance, 2D operation mode) are concurrently activated (operation S410). Thus, the second sensing is performed or the input signal is generated based on the user's input (operation S420). The first target operation is performed based on the second sensing or the input signal (operation S430). For instance, when the subject 180 is proximate to the 3D image sensor 100, a screen to select a menu and/or an application is displayed on the display device 1041 and the 3D operation mode and the 2D operation mode are concurrently activated. At this time, the second sensing may be performed to recognize the motion of the subject 180 as shown in FIGS. 8B and 8D or the input signal may be generated based on the touch event as shown in FIGS. 11A and 11B. The mobile system 1000 may select or execute the menu and/or application based on the second sensing and the input signal. That is, the first target operation may be the 3D interface operation or the 2D interface operation.

One of the operation modes of the mobile system 1000 is selected based on the first target operation (operation S435). If the second sensing is required as a result of the first target operation (operation S435: U3), the second operation mode is selected (operation S440), the 3D image sensor 100 performs the second sensing (operation S450) and the mobile system 1000 performs the second target operation based on the second sensing (operation S460). If the operation by using the input device is required as a result of the first target operation (operation S435: U2), the third operation mode is selected (operation S470), the input device generates the input signal based on the user's input (operation S480) and the mobile system 1000 performs the third target operation based on the input signal (operation S490).

Figure 13:
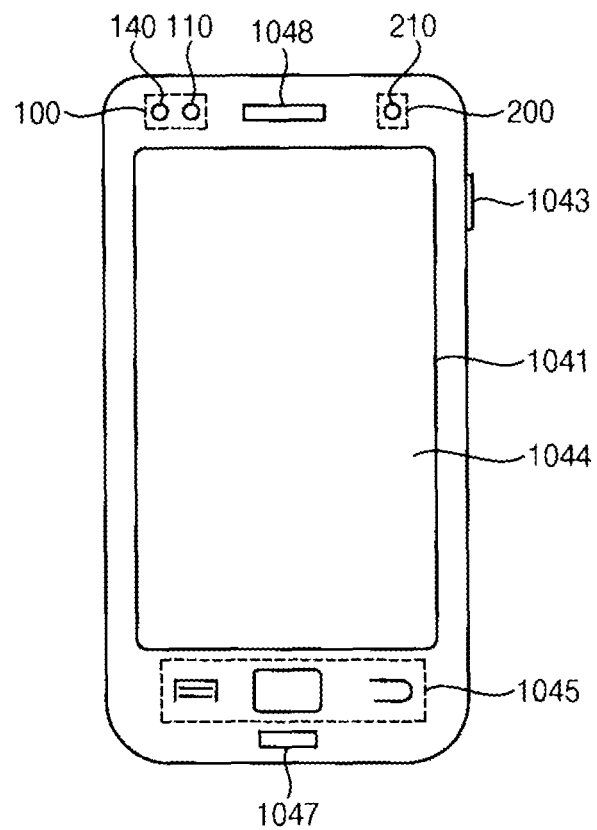
FIG. 13 is a plan view illustrating a mobile system according to some example embodiments.

FIG. 13 is a plan view illustrating the mobile system according to some example embodiments.

Referring to FIG. 13, the mobile system 1100 includes a 3D image sensor 100, a 2D image sensor 200 and a display device 1041. The mobile system 1100 may further include a touch screen 1044, buttons 1043 and 1045, a microphone 1047, and a speaker 1048.

When comparing with the mobile system 1000 of FIG. 1, the mobile system 1100 of FIG. 13 may further include the 2D image sensor 200.

The 3D image sensor 100 is installed on a first surface (for instance, a front surface) of the mobile system 1100. The 3D image sensor 100 performs a first sensing to detect proximity of a subject and a second sensing to recognize a gesture of the subject by acquiring distance information for the subject. The 3D image sensor 100 may include a sensing unit 110 having a plurality of depth pixels and a light source unit 140 to emit infrared rays or near-infrared rays.

The 2D image sensor 200 is installed on the first surface of the mobile system 1100 and performs a third sensing to acquire color image information for the subject. The 2D image sensor 200 may include a second sensing unit 210 having a plurality of color pixels.

In the example embodiment of FIG. 13, the 3D image sensor 100 and the 2D image sensor 200 may be prepared as two integrated circuit chips separated from each other. That is, the mobile system 1100 may include two sensing modules. In this case, the depth pixels and the color pixels may constitute two pixel arrays separated from each other.

The display device 1041 is installed on the first surface of the mobile system 1100 to display the results of the first sensing, the second sensing, and the third sensing.

The mobile system 1100 according to some example embodiments includes the 3D image sensor 100 that performs the first sensing and the second sensing so that the mobile system 1100 may have the motion recognition function as well as the proximity sensing function without increasing the size of the mobile system 1100. In addition, all or part of the depth pixels included in the first sensing unit 110 and the light source unit 140 of the 3D image sensor 100 are selectively activated according to the operation mode and the 2D image sensor 200 is also selectively activated according to the operation mode. Thus, power consumption of the 3D image sensor 100, and the 2D image sensor 200, and the mobile system 1100 can be reduced.

Meanwhile, in the case that the 2D image sensor 200 is inactivated, the mobile system 1100 may be substantially identical to the mobile system 1000 of FIG. 1. In this case, the mobile system 1100 may be operated based on some example embodiments described above with reference to FIGS. 4 to 11.

Figure 14:
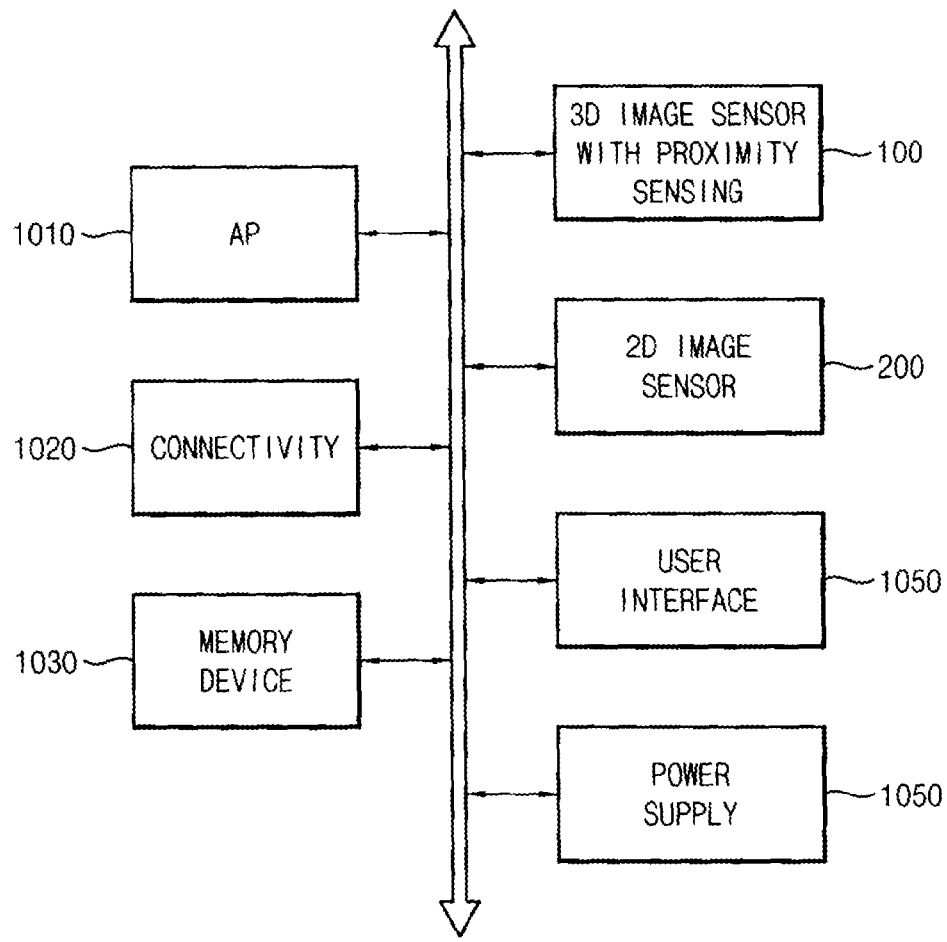
FIG. 14 is a block diagram illustrating the mobile system shown in FIG. 13.

FIG. 14 is a block diagram illustrating the mobile system shown in FIG. 13.

Referring to FIG. 14, the mobile system 1100 includes an application processor 1010, a connectivity unit 1020, a memory device 1030, a 3D image sensor 100, a user interface 1040, and a power supply 1050.

When comparing with the mobile system 1000 of FIG. 2, the mobile system 1100 of FIG. 14 may further include the 2D image sensor 200.

The 3D image sensor 100 may perform the first sensing and the second sensing and the 2D image sensor 200 may perform the third sensing. For instance, the 3D image sensor 100 may primarily perform the first sensing and at least one of the second sensing and the third sensing may be performed based on the result of the first sensing.

Figure 15:
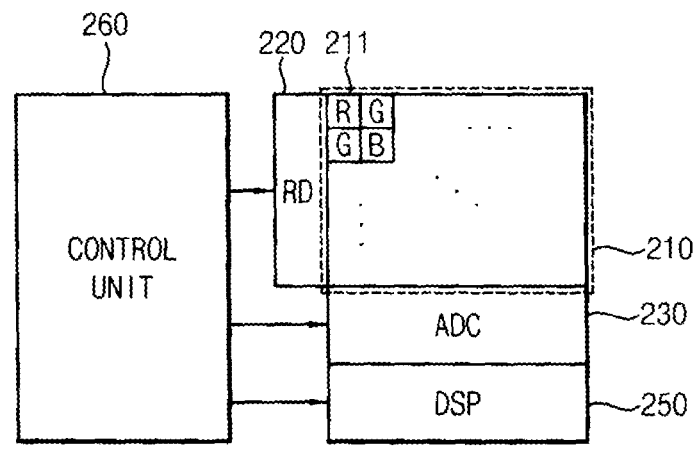
FIG. 15 is a block diagram illustrating an example of a two-dimensional (2D) image sensor included in the mobile system shown in FIG. 13.

FIG. 15 is a block diagram illustrating an example of the 2D image sensor 200 included in the mobile system 1000 shown in FIG. 13.

Referring to FIG. 15, the 2D image sensor 200 may include a second sensing unit 210, a row driving unit 220, an ADC (Analog-to-Digital Converting) unit 230, a DSP (Digital Signal Processing) unit 250, and a control unit 260.

The second sensing unit 210 may convert incident light (for instance, visible rays) into an electric signal. The second sensing unit 210 may include a plurality of color pixels 211. The color pixels 211 are aligned in the form of a pixel array and provide information about the color image for the subject. For instance, a red filter, a green filter(s), and a blue filter may be formed on the color pixels 211. In some example embodiments, a yellow filter, a cyan filter(s), and a magenta filter may be formed on the color pixels 211.

The row driving unit 220 is connected to each row of the second sensing unit 210 to generate a driving signal to drive each row. The ADC unit 230 is connected to each column of the second sensing unit 210 to convert an analog signal output from the second sensing unit 210 into a digital signal. According to some example embodiments, the ADC unit 230 may include a CDS (Correlated Double Sampling) unit to extract effective signal components. The DSP unit 250 receives the digital signal output from the ADC unit 230 to perform the image data processing with respect to the digital signal. The control unit 260 may control the row driving unit 220, the ADC unit 230, and the DSP unit 250.

Figure 16A:
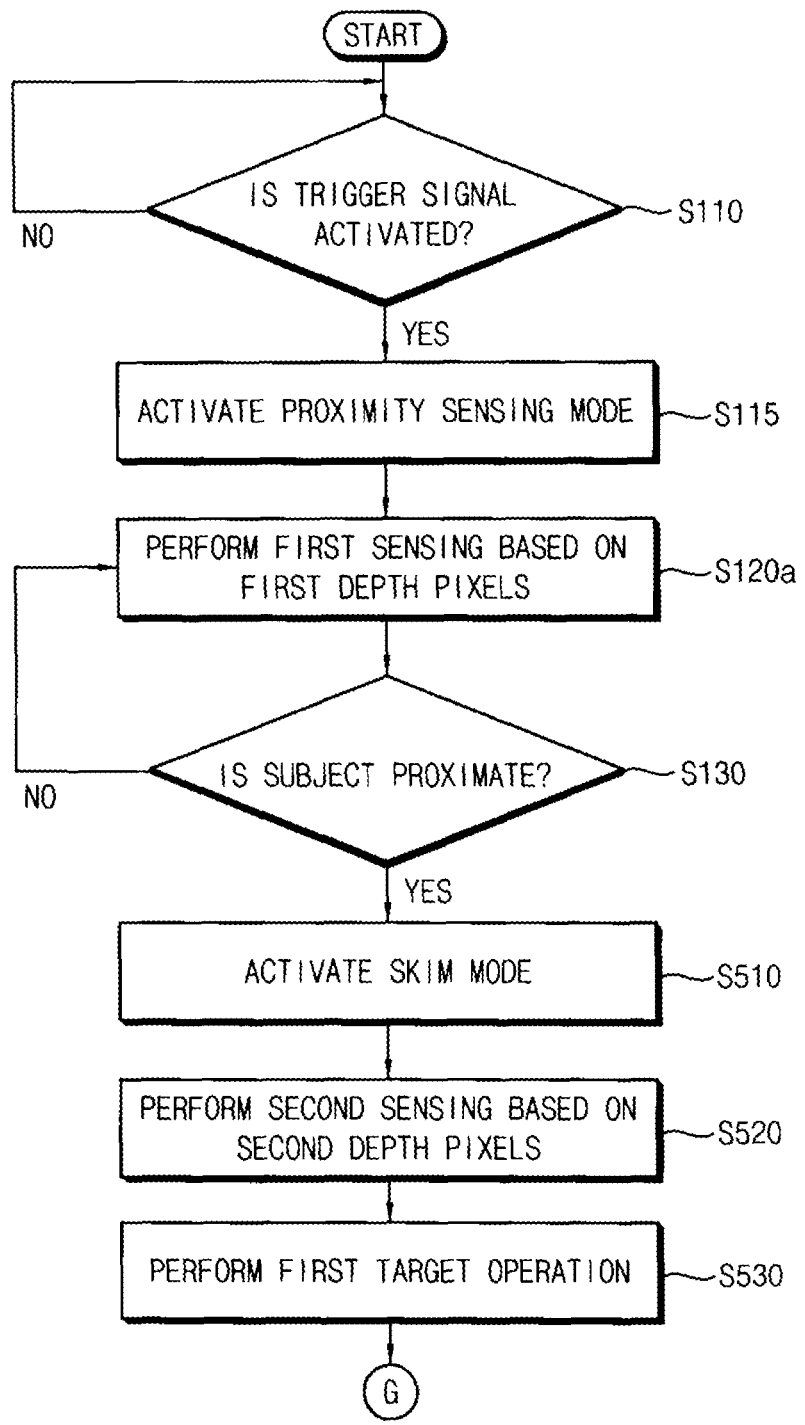

FIGS. 16A and 16B are flowcharts illustrating a method of operating the image sensor according to some example embodiments. The method of operating the image sensor illustrated in FIGS. 16A and 16B may be applied to operate the 3D image sensor 100 and the 2D image sensor 200 installed in the mobile system 1100. The 3D image sensor 100 includes a plurality of depth pixels and performs the proximity sensing and the motion recognition. The 2D image sensor 200 includes a plurality of color pixels and provides color image information.

Referring to FIGS. 13, 16A, and 16B, in order to operate the image sensor, it is determined whether a trigger signal is activated (operation S110). If the trigger signal is inactivated (operation S110: NO), the mobile system 1100 waits for activation of the trigger signal. If the trigger signal is activated (operation S110: YES), the first operation mode (for instance, proximity sensing mode) is activated (S115). The 3D image sensor 100 performs the first sensing to detect proximity of the subject based on the first depth pixels adjacent to each other (operation S120a). For instance, when another user send a call or the user presses the power button 1043, the trigger signal is activated and the first operation mode is activated so that the first sensing may be performed.

The proximity of the subject is determined based on the first sensing (operation S130). If it is determined that the subject is not proximate to the 3D image sensor 100 (operation S130: NO), the 3D image sensor 100 keeps on performing the first sensing.

If it is determined that the subject is proximate to the 3D image sensor 100 (operation S130: YES), the second operation mode (for instance, skim mode) is activated (operation S510). The 3D image sensor 100 acquires information about the distance of the subject based on the second depth pixels, which are adjacent to each other from among the depth pixels while constituting a partial array, and performs the second sensing to recognize the motion of the subject (operation S520). Then, the first target operation is performed based on the second sensing (operation S530). For instance, when the subject is proximate to the 3D image sensor 100, a screen to answer the incoming call or to select the menu and/or application is displayed on the display device 1041 and the menu and/or application may be selected or executed based on the second sensing by the second depth pixels. That is, the first target operation may be the 3D interface operation. In the second operation mode, relatively simple motion recognition may be performed.

In some example embodiments, the number of the second depth pixels may be greater than the number of the first depth pixels.

The operation mode of the mobile system 1100 is changed based on the first target operation (operation S535).

When relatively complex motion recognition is required as a result of the first target operation (operation S535: MD), the third operation mode (for instance, depth mode) is activated (operation S540). The 3D image sensor 100 performs the second sensing based on all of the depth pixels (operation S545). The mobile system 1100 performs the second target operation based on the second sensing (operation S550). For instance, when a game application is executed based on the first target operation, the game manipulation may be performed based on the second sensing with respect to all of the depth pixels. That is, the second target operation may be the 3D application operation.

If a color image photographing is required as a result of the first target operation (operation S535: MC), the fourth operation mode (for instance, color mode) is activated (operation S560). The 2D image sensor 200 performs the third sensing to acquire color image information for the subject based on all of the color pixels (operation S565). The mobile system 1100 performs the third target operation based on the third sensing (operation S570). For instance, when the 2D camera application is executed based on the first target operation, the 2D color image may be photographed based on the third sensing. That is, the third target operation may refer to the operation to photograph the 2D color image.

All of the depth pixels are exclusively activated in the third operation mode and all of the color pixels are exclusively activated in the fourth operation mode. Thus, the third and fourth operation modes may be referred to as individual modes.

If a color 3D image photographing is required as a result of the first target operation (operation S535: MCC), the fifth operation mode (for instance, concurrent mode) is activated (operation S580). The 3D image sensor 100 performs the second sensing based on all of the depth pixels, and concurrently, performs the third sensing based on all of the color pixels (operation S585). The fourth target operation is performed based on the second sensing and the third sensing (operation S590). For instance, when the 3D camera application is executed based on the first target operation, the 3D color image may be photographed based on the second sensing and the third sensing. That is, the fourth target operation may refer to the operation to photograph the 3D color image (for instance, 3D photographing operation).

In the example embodiment of FIGS. 16A and 16B, if it is determined that the subject is proximate to the 3D image sensor 100, the skim mode is activated and the operation mode of the mobile system 1100 may be converted from the skim mode to the depth mode, the color mode or the concurrent mode based on the 3D interface operation performed in the skim mode.

Although not shown in FIGS. 16A and 16B, when the second operation mode is activated according to some example embodiments (operation S510), at least a part of the color pixels may be further activated. For instance, when the 3D interface operation is performed while the image communication is being performed, the second depth pixels and at least a part of the color pixels may be concurrently activated. The 2D image sensor 200 may further perform the third sensing based on at least a part of the color pixels activated in the second operation mode.

FIGS. 17, 18A, 18B, 18C, 18D, 19A, 19B, and 20 are views illustrating a method of operating the image sensor shown in FIGS. 16A and 16B. For the purpose of convenience of illustration, only the first sensing unit 110 including a plurality of depth pixels and the second sensing unit 210 including a plurality of color pixels are illustrated in the image sensors in FIGS. 17, 18A, 18B, 18C, 18D, 19A, 19B, and 20.

Figure 17:
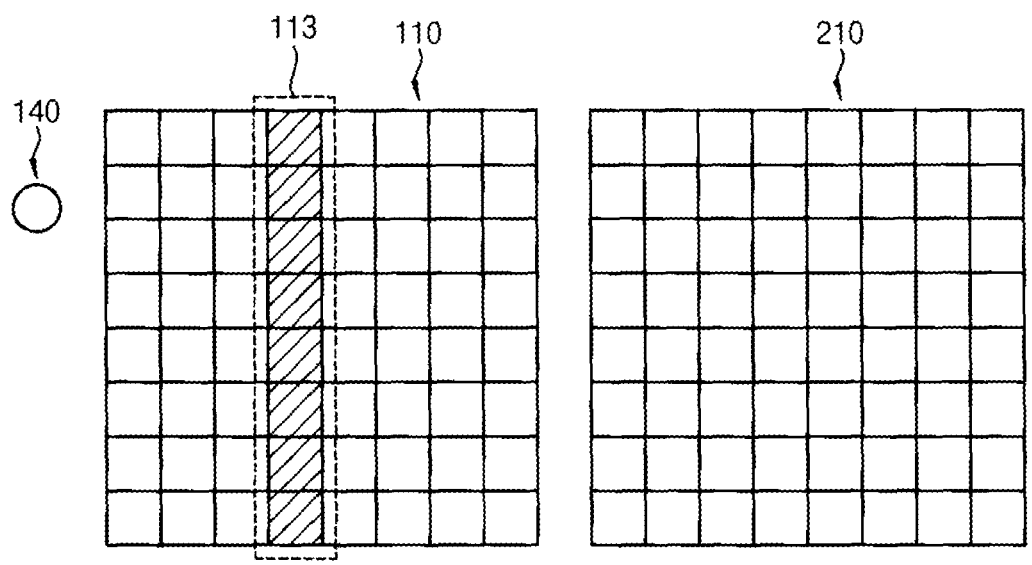
FIGS. 17, 18A, 18B, 18C, 18D, 19A, 19B, and 20 are views illustrating a method of operating the image sensor shown in FIGS. 16A and 16B.

Referring to FIGS. 16A and 17, when the first operation mode is activated (operation S115), first depth pixels 113 of the depth pixels included in the first sensing unit 110 may be activated and the light source unit 140 is inactivated so that light may not be emitted. All of the color pixels included in the second sensing unit 210 may be inactivated. Thus, when the proximity sensing is performed, power consumption of the 3D image sensor 100, the 2D image sensor 200, and the mobile system 1100 can be reduced.

In FIG. 17, the first depth pixels 113 are aligned corresponding to one column of the depth pixels. However, according to some example embodiments, the first depth pixels 113 may be aligned corresponding to one row of the depth pixels or may be aligned corresponding to a part of one row or one column. Further, according to some example embodiments, as shown in FIGS. 6C and 6D, the light source unit 140 may emit low-brightness light in the first operation mode.

Figure 18A:
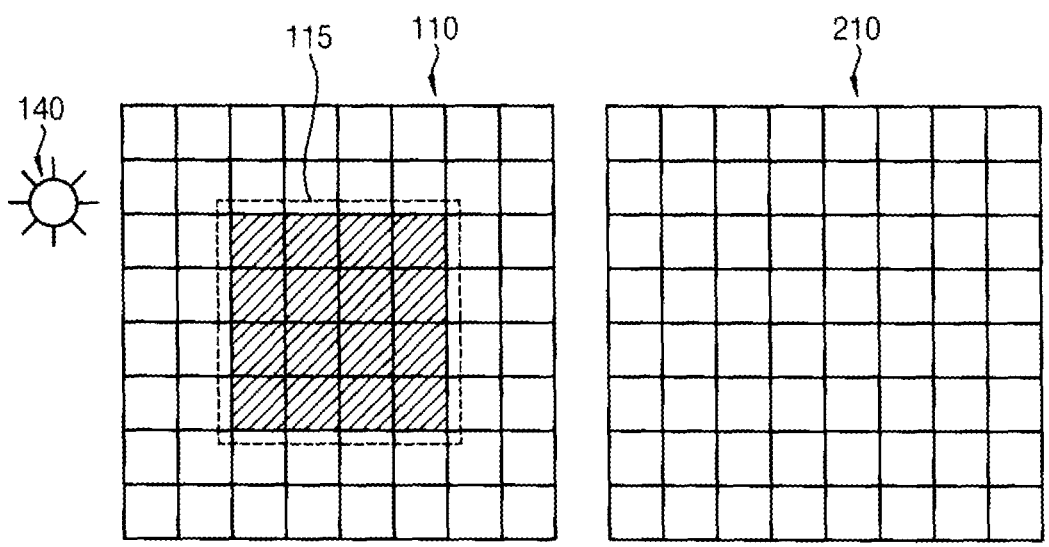

Referring to FIGS. 16A and 18A, when the second operation mode is activated (operation S510), second depth pixels 115 of the depth pixels included in the first sensing unit 110 may be activated and the light source unit 140 may emit high-brightness light as shown in FIG. 6B. All of the color pixels included in the second sensing unit 210 may be inactivated. Therefore, when the relatively simple motion recognition is performed, power consumption of the 3D image sensor 100, and the 2D image sensor 200, and the mobile system 1100 can be reduced. Especially, in the example embodiment of FIG. 18A, power consumption of the first sensing unit 110 can be reduced.

Figure 18B:
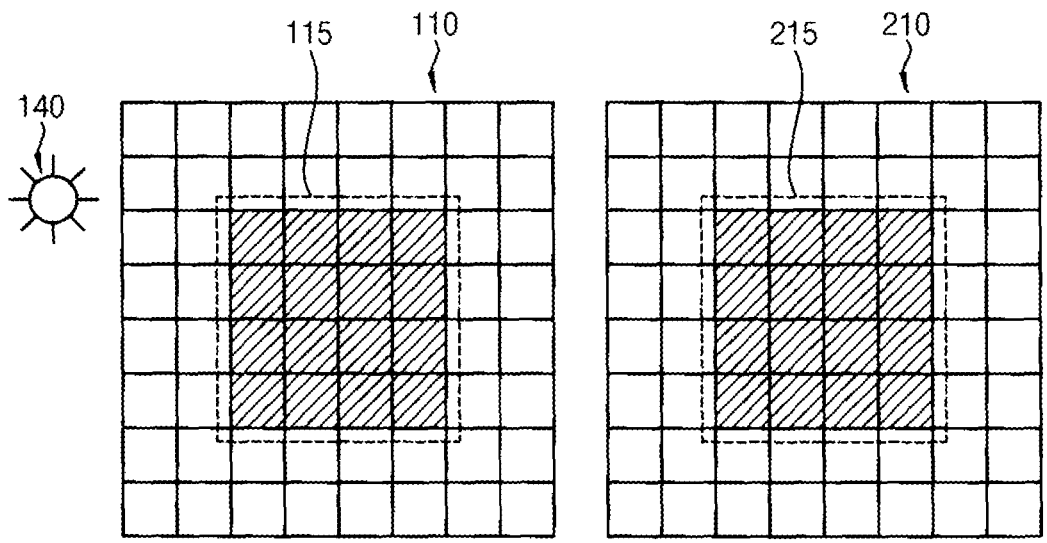
Figure 18C:
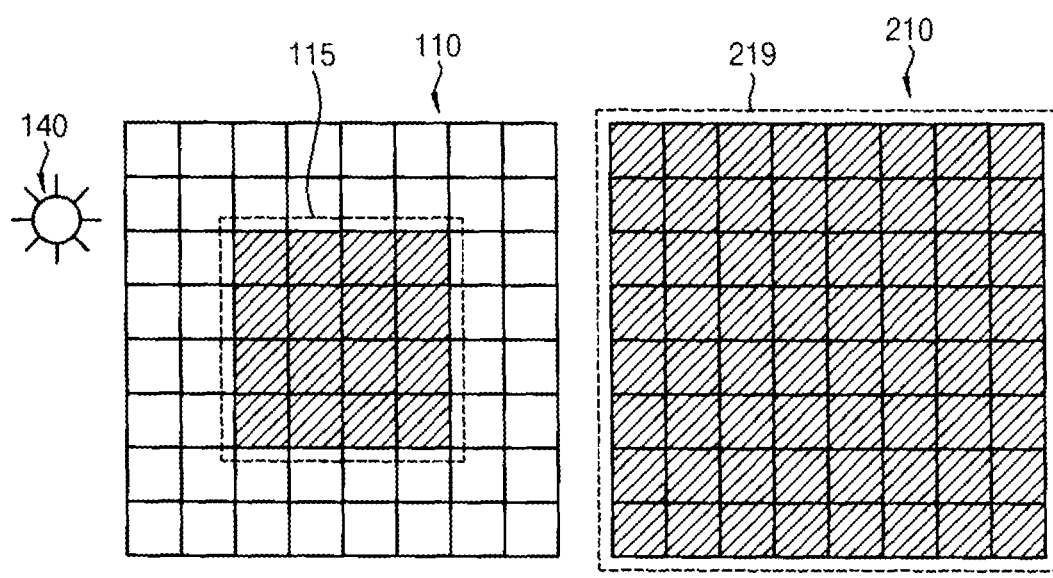

Referring to FIGS. 16A, 18B, and 18C, when the second operation mode is activated (operation S510), second depth pixels 115 of the depth pixels included in the first sensing unit 110 may be activated and the light source unit 140 may emit high-brightness light as shown in FIG. 6B. At this time, first color pixels 215 of the color pixels included in the second sensing unit 210, which correspond to the second depth pixels 115, may be activated (see, FIG. 18B) or all of the color pixels 219 may be activated (see, FIG. 18C).

Figure 18D:
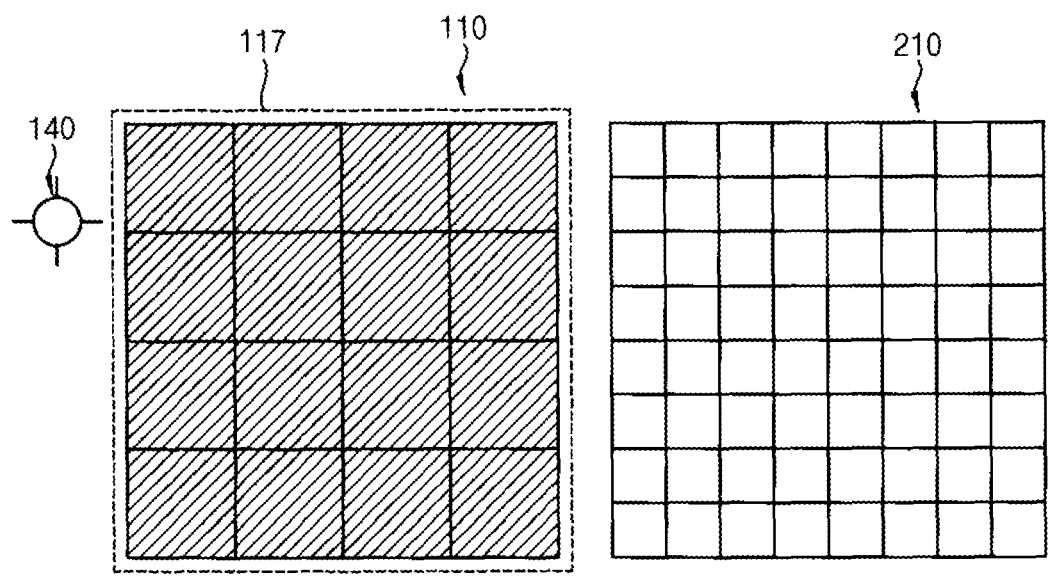

Referring to FIGS. 16A and 18D, when the second operation mode is activated (operation S510), the binning operation may be performed with respect to the depth pixels included in the first sensing unit 110. For instance, as shown in FIG. 18D, one pixel may be formed by combining adjacent four pixels (that is, 2×2 binning) and the second sensing may be performed by activating all of the combined pixels 117. As shown in FIG. 6C, the light source unit 140 may emit low-brightness light. All of the color pixels included in the second sensing unit 210 can be inactivated. Therefore, when the relatively simple motion recognition is performed, power consumption of the 3D image sensor 100, and the 2D image sensor 200, and the mobile system 1100 can be reduced. Especially, in the example embodiment of FIG. 18D, power consumption of the light source unit 140 can be reduced.

According to some example embodiments, the binning operation may be performed using hardware or software.

According to some example embodiments, when the binning operation is performed with respect to the depth pixels included in the first sensing unit 110, all color pixels 219 or part (for instance, first color pixels 215 of FIG. 18B) of the color pixels included in the second sensing unit 210 may be activated.

Figure 19A:
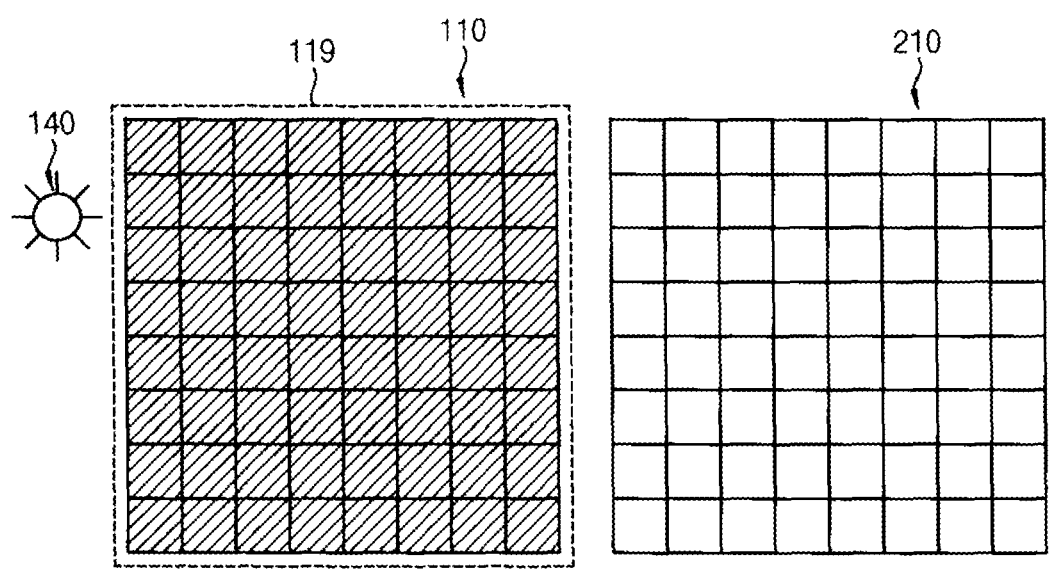

Referring to FIGS. 16B and 19A, when the third operation mode is activated (operation S40), all depth pixels 119 included in the first sensing unit 110 may be activated and the light source unit 140 may emit high-brightness light as shown in FIG. 6B. All of the color pixels included in the second sensing unit 210 may be inactivated. Thus, the relatively complex motion recognition can be accurately performed.

Figure 19B:
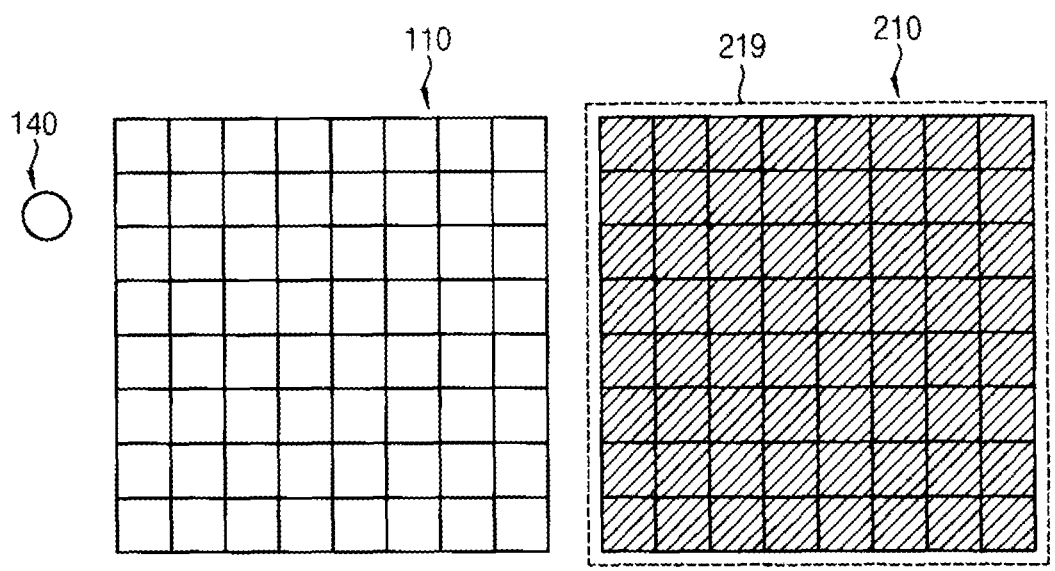

Referring to FIGS. 16B and 19B, when the fourth operation mode is activated (operation S60), all color pixels 219 included in the second sensing unit 210 may be activated. All of the depth pixels included in the first sensing unit 110 and the light source unit 140 may be inactivated. Thus, the 2D color image may be effectively photographed.

Figure 20:
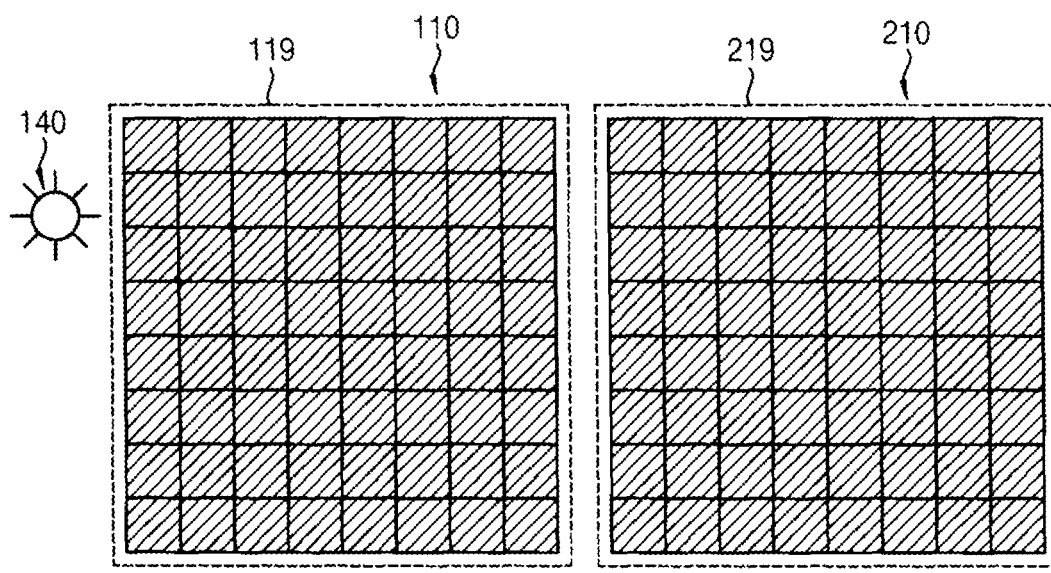

Referring to FIGS. 16B and 20, when the fifth operation mode is activated (operation S60), all depth pixels 119 included in the first sensing unit 110 may be activated and the light source unit 140 may emit high-brightness light as shown in FIG. 6B. All color pixels 219 included in the second sensing unit 210 may be activated. Thus, the 3D color image may be effectively photographed.

As described above, all or part of the depth pixels included in the 3D image sensor 100 and/or the color pixels included in the 2D image sensor 200 may be selectively activated according to the operation mode and the light source unit 140 is selectively activated or emits the lights having mutually different brightness according to the operation mode, so that power consumption of the 3D image sensor 100, and the 2D image sensor 200, and the mobile system 1100, including the 3D image sensor 100 and the 2D image sensor 200 can be reduced.

FIGS. 21A and 21B are flowcharts illustrating a method of operating an image sensor according to some example embodiments.

Referring to FIGS. 21A and 21B, when comparing with FIGS. 16A and 16B, operations S515, S555, S575, and S595 may be additionally performed to operate the image sensor. Operations S110, S115, S120a, S130, S510, S520, S530, S540, S545, S550, S560, S565, S570, S580, S585, and S590 of FIGS. 21A and 21B may be substantially identical to operations S110, S115, S120a, S130, S510, S520, S530, S540, S545, S550, S560, S565, S570, S580, S585, and S590 of FIGS. 16A and 16B, respectively, so redundant description thereof will be omitted.

After the second operation mode is activated (operation S510), it is determined whether the first finish command is generated (operation S515). If the first finish command is not generated (operation S515: NO), the 3D image sensor 100 performs the second sensing based on the second depth pixels (operation S520). If the first finish command is generated (operation S515: YES), the second operation mode is finished and the first operation mode is again activated (operation S115).

After the second target operation has been performed (operation S550), it is determined whether the second finish command is generated (operation S555). If the second finish command is not generated (operation S555: NO), the mobile system waits for the gesture of the subject. If the gesture of the subject is generated, the second sensing is performed (operation S545) and the second target operation is performed (operation S550) and this process is repeated. If the second finish command is generated (operation S555: YES), the third operation mode is finished and the second operation mode is again activated (operation S510).

After the third target operation has been performed (operation S570), it is determined whether the third finish command is generated (operation S575). If the third finish command is not generated (operation S575: NO), the third sensing is performed according to the user's input (operation S565) and the third target operation is performed (operation S570) and this process is repeated. If the third finish command is generated (operation S575: YES), the fourth operation mode is finished and the second operation mode is again activated (operation S510).

After the fourth target operation has been performed (operation S590), it is determined whether the fourth finish command is generated (operation S595). If the fourth finish command is not generated (operation S595: NO), the second sensing and the third sensing are performed according to the user's input (operation S585) and the fourth target operation is performed (operation S590) and this process is repeated. If the fourth finish command is generated (operation S595: YES), the fifth operation mode is finished and the second operation mode is again activated (operation S510).

Figure 22A:
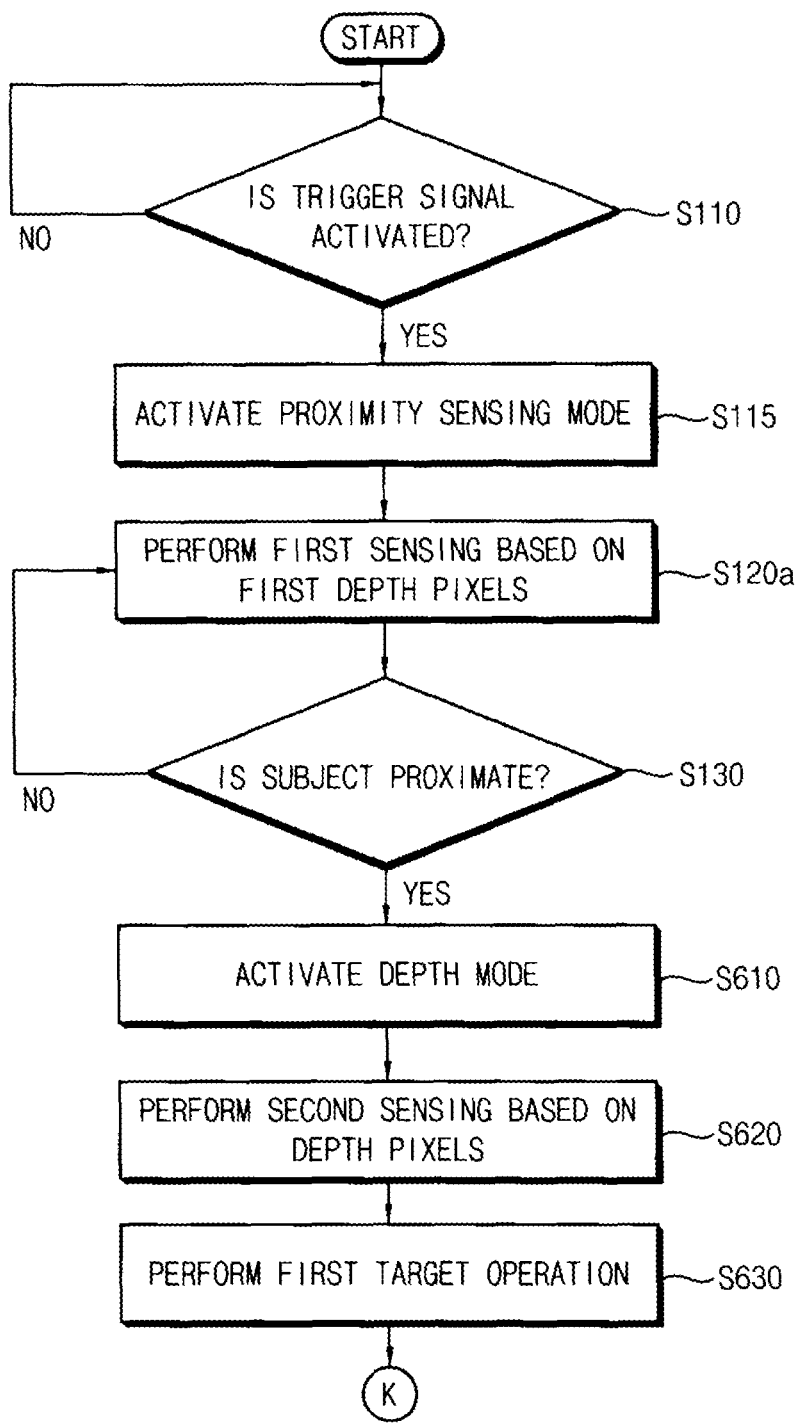
FIGS. 22A and 22B are flowcharts illustrating a method of operating an image sensor according to some example embodiments.
Figure 22B:
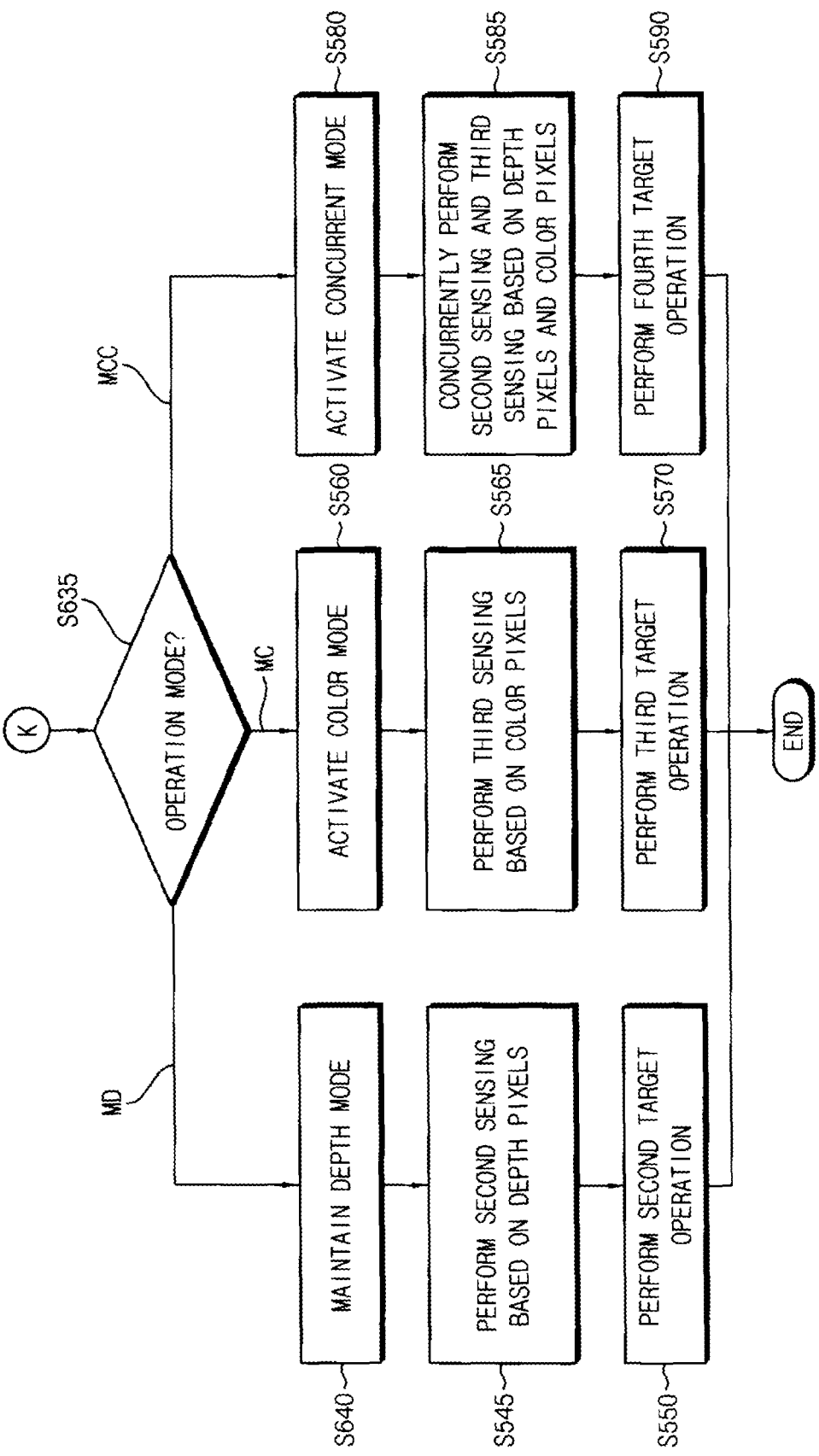

FIGS. 22A and 22B are flowcharts illustrating a method of operating the image sensor according to some example embodiments. The method of operating the image sensor illustrated in FIGS. 22A and 22B may be applied to operate the 3D image sensor 100 and the 2D image sensor 200 installed in the mobile system 1100.

Referring to FIGS. 13, 22A, and 22B, in order to operate the image sensor, it is determined whether a trigger signal is activated (operation S110). If the trigger signal is inactivated (operation S110: NO), the mobile system 1100 waits for activation of the trigger signal. If the trigger signal is activated (operation S110: YES), the first operation mode (for instance, proximity sensing mode) is activated (operation S115), the first sensing is performed based on the first depth pixels (operation S120a) and proximity of the subject is determined (operation S130). Operations S110, S115, S120a, and S130 may be substantially identical to operations S110, S115, S120a, and S130 shown in FIG. 16A.

If it is determined that the subject is proximate to the 3D image sensor 100 (operation S130: YES), the third operation mode (for instance, depth mode) is activated (operation S610). The 3D image sensor 100 performs the second sensing based on all of the depth pixels (operation S620). The mobile system 1100 performs the first target operation based on the second sensing (operation S630). The first target operation may be the 3D interface operation and the 3D interface operation can be performed based on the relatively simple motion recognition.

The operation mode of the mobile system 1100 may be changed or not based on the first target operation (operation S635).

As a result of the first target operation, if the relatively complex motion recognition is required (operation S635: MD), the third operation mode is maintained (operation S640). The 3D image sensor 100 performs the second sensing based on all of the depth pixels (operation S545). The mobile system 1100 performs the second target operation based on the second sensing (operation S550). If a color image photographing is required as a result of the first target operation (operation S635: MC), the fourth operation mode (for instance, color mode) is activated (operation S560). The 2D image sensor 200 performs the third sensing to acquire color image information for the subject based on all of the color pixels (operation S565). The mobile system 1100 performs the third target operation based on the third sensing (operation S570). If a color 3D image photographing is required as a result of the first target operation (operation S635: MCC), the fifth operation mode (for instance, concurrent mode) is activated (operation S580). The 3D image sensor 100 concurrently performs the second sensing and the third sensing based on all of the depth pixels and the color pixels (operation S585). The fourth target operation is performed based on the second sensing and the third sensing (operation S590). Operations S545, S550, S560, S565, S570, S580, S585, and S590 may be substantially identical to operations S545, S550, S560, S565, S570, S580, S585, and S590 of FIG. 16B, respectively.

In the example embodiment of FIGS. 22A and 22B, if it is determined that the subject is proximate to the 3D image sensor 100, the depth mode is activated instead of the skim mode and the operation mode of the mobile system 1100 may be maintained in the depth mode or may be converted from the depth mode to the color mode or the concurrent mode based on the 3D interface operation performed in the depth mode.

Although not shown in FIGS. 22A and 22B, similarly to the example embodiment of FIGS. 21A and 21B, operations of determining whether the first to fourth finish commands are generated may be further added when operating the image sensor.

Meanwhile, according to some example embodiments, the method of operating the image sensor shown in FIGS. 16A, 16B, 21A, 21B, 22A, and 22B may also be applicable to operate the mobile system 1100 including the 3D image sensor 100 and the 2D image sensor 200.

FIG. 23 is a flowchart illustrating a method of operating the mobile system according to some example embodiments. The method of operating the mobile system shown in FIG. 23 may also be applicable to operate the mobile system 1100 including the 3D image sensor 100, the 2D image sensor 200, and the input device.

Referring to FIGS. 13, 16B, and 23, in order to operate the mobile system, it is determined whether a trigger signal is activated (operation S110). If the trigger signal is inactivated (operation S110: NO), the mobile system 1100 waits for activation of the trigger signal. If the trigger signal is activated (operation S110: YES), the first operation mode (for instance, proximity sensing mode) is activated (operation S115), the first sensing is performed based on the first depth pixels (operation S120a) and proximity of the subject is determined (operation S130). Operations S110, S115, S120a, and S130 may be substantially identical to operations S110, S115, S120a, and S130 shown in FIG. 16A.

If it is determined that the subject is proximate to the 3D image sensor 100 (operation S130: YES), the 2D operation mode is activated (operation S710). The input device, such as the touch screen 1044 and the buttons 1043 and 1045, generates the input signal based on the user's input (operation S720). The first target operation is performed based on the input signal (operation S730). For instance, when the subject is proximate to the 3D image sensor 100, a screen to select a menu and/or an application is displayed on the display device 1041 and the menu and/or an application may be selected or executed based on the input signal caused by the touch event, such as a touch to the touch screen 1044. That is, the first target operation may be the 2D interface operation.

The operation mode of the mobile system 1100 may be changed based on the first target operation (operation S535).

When relatively complex motion recognition is required as a result of the first target operation (operation S535: MD), the third operation mode is maintained (operation S540). If a color image photographing is required as a result of the first target operation (operation S535: MC), the fourth operation mode (for instance, color mode) is activated (operation S560). If a color 3D image photographing is required as a result of the first target operation (operation S535: MCC), the fifth operation mode (for instance, concurrent mode) is activated (operation S580).

In the example embodiment of FIGS. 23 and 16B, if it is determined that the subject is proximate to the 3D image sensor 100, the 2D operation mode is activated instead of the skim mode and the operation mode of the mobile system 1100 may be converted from the 2D operation mode to the depth mode, the color mode or the concurrent mode in the 2D operation mode based on the 2D interface operation performed in the 2D operation mode.

Although not shown in FIGS. 23 and 16B, similarly to the example embodiment of FIGS. 21A and 21B, operations of determining whether the first to fourth finish commands are generated may be further added when operating the mobile system.

Figure 24:
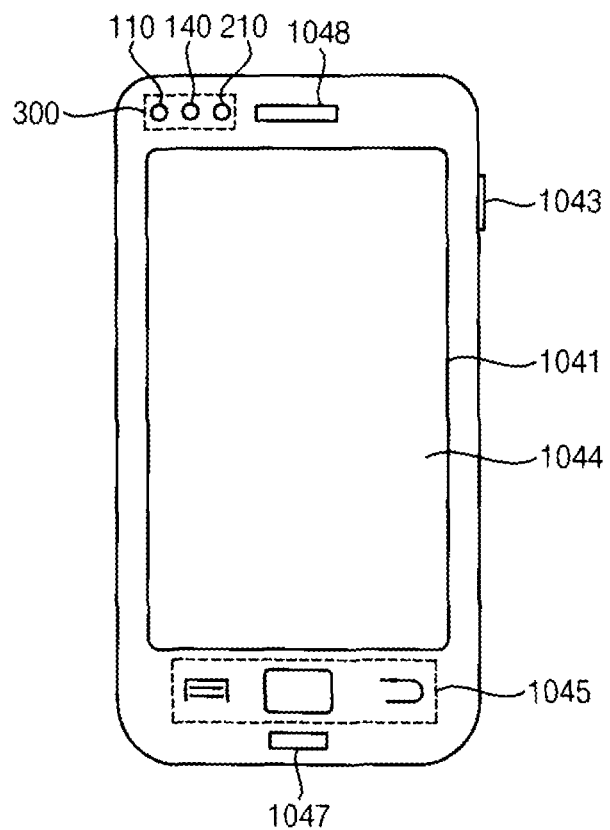
FIG. 24 is a plan view illustrating a mobile system according to some example embodiments.

FIG. 24 is a plan view illustrating the mobile system according to some example embodiments.

Referring to FIG. 24, the mobile system 1200 includes an image sensor 300 and a display device 1041. The mobile system 1200 may further include a touch screen 1044, buttons 1043 and 1045, a microphone 1047, and a speaker 1048.

The image sensor 300 is installed on a first surface (for instance, a front surface) of the mobile system 1200. The image sensor 300 performs a first sensing to detect proximity of a subject, a second sensing to recognize a gesture of the subject by acquiring distance information for the subject, and a third sensing to acquire color image information for the subject. The image sensor 300 may include a first sensing unit 110 having a plurality of depth pixels, a light source unit 140 to emit infrared rays or near-infrared rays, and a second sensing unit 210 having a plurality of color pixels.

In the example embodiment of FIG. 24, a 3D image sensor and a 2D image sensor may be prepared as one integrated circuit chip. That is, the mobile system 1200 may include one sensing module. In this case, the depth pixels and the color pixels may constitute two pixel arrays separated from each other.

The display device 1041 is installed on the first surface of the mobile system 1200 to display the results of the first sensing, the second sensing and the third sensing.

The mobile system 1200 of FIG. 24 is substantially identical to the mobile system 1100 of FIG. 13, except that the 3D image sensor and the 2D image sensor of the mobile system 1200 are prepared as one integrated circuit chip. Therefore, the mobile system 1200 may be operated based on some example embodiments described above with reference to FIGS. 16A to 23. In the case that the second image sensor (that is, second sensing unit 210) is inactivated, the mobile system 1200 can be operated based on some example embodiments described above with reference to FIGS. 4 to 11.

Figure 25:
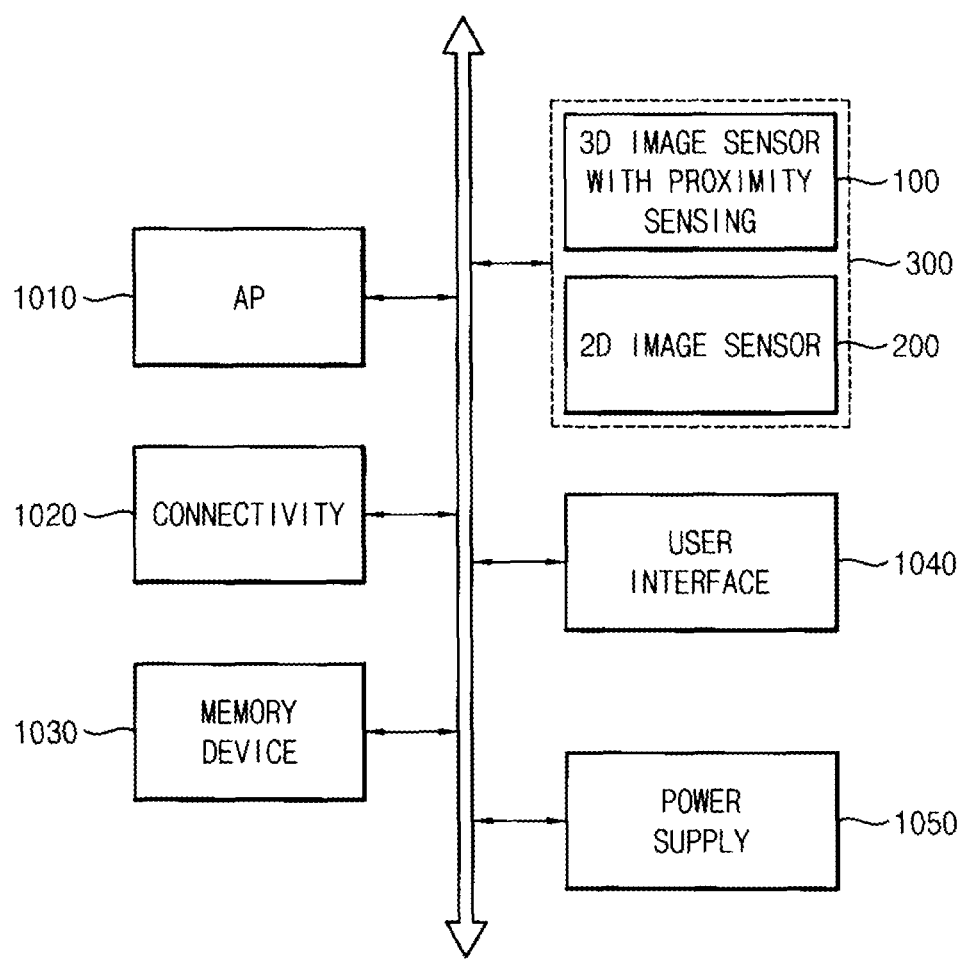
FIG. 25 is a block diagram illustrating an example of the mobile system shown in FIG. 24.

FIG. 25 is a block diagram illustrating an example of the mobile system 1200 shown in FIG. 24.

Referring to FIG. 25, the mobile system 1200 includes an application processor 1010, a connectivity unit 1020, a memory device 1030, an image sensor 300, a user interface 1040, and a power supply 1050.

When comparing with the mobile system 1100 of FIG. 14, the mobile system 1200 of FIG. 25 may further include the image sensor 300 where the 3D image sensor 100 and the 2D image sensor 200 are integrated.

The image sensor 300 may perform the first sensing, the second sensing and the third sensing. For instance, the image sensor 300 may primarily perform the first sensing and at least one of the second sensing and the third sensing may be performed based on the result of the first sensing.

Figure 26:
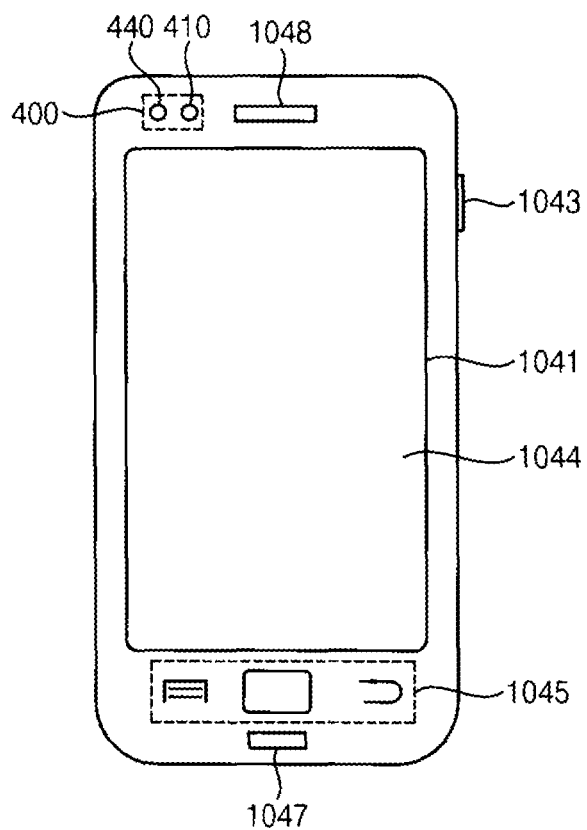
FIG. 26 is a plan view illustrating a mobile system according to some example embodiments.

FIG. 26 is a plan view illustrating the mobile system according to some example embodiments.

Referring to FIG. 26, the mobile system 1300 includes an image sensor 400 and a display device 1041. The mobile system 1300 may further include a touch screen 1044, buttons 1043 and 1045, a microphone 1047, and a speaker 1048.

The image sensor 400 is installed on a first surface (for instance, a front surface) of the mobile system 1300. The image sensor 400 performs a first sensing to detect proximity of a subject, a second sensing to recognize a gesture of the subject by acquiring distance information for the subject and a third sensing to acquire color image information for the subject. The image sensor 400 may include a sensing unit 410 having a plurality of depth pixels and color pixels and a light source unit 440 to emit infrared rays or near-infrared rays.

In the example embodiment of FIG. 26, a 3D image sensor and a 2D image sensor may be prepared as one integrated circuit chip. That is, the mobile system 1300 may include one sensing module. In this case, the depth pixels and the color pixels may constitute one pixel array. In detail, the image sensor 400 may be a 3D color image sensor, for instance, an RGBZ (red, green, blue, depth) sensor.

The display device 1041 is installed on the first surface of the mobile system 1300 to display the results of the first sensing, the second sensing and the third sensing.

The mobile system 1300 of FIG. 26 is substantially identical to the mobile system 1100 of FIG. 13, except that the 3D image sensor and the 2D image sensor of the mobile system 1300 are prepared as one integrated circuit chip and the depth pixels and the color pixels constitute one pixel array. Therefore, the mobile system 1300 may be operated based on the example embodiments described above with reference to FIGS. 16A to 23. In the case that the color pixels are inactivated, the mobile system 1300 can be operated based on some example embodiments described above with reference to FIGS. 4 to 11.

Figure 27:
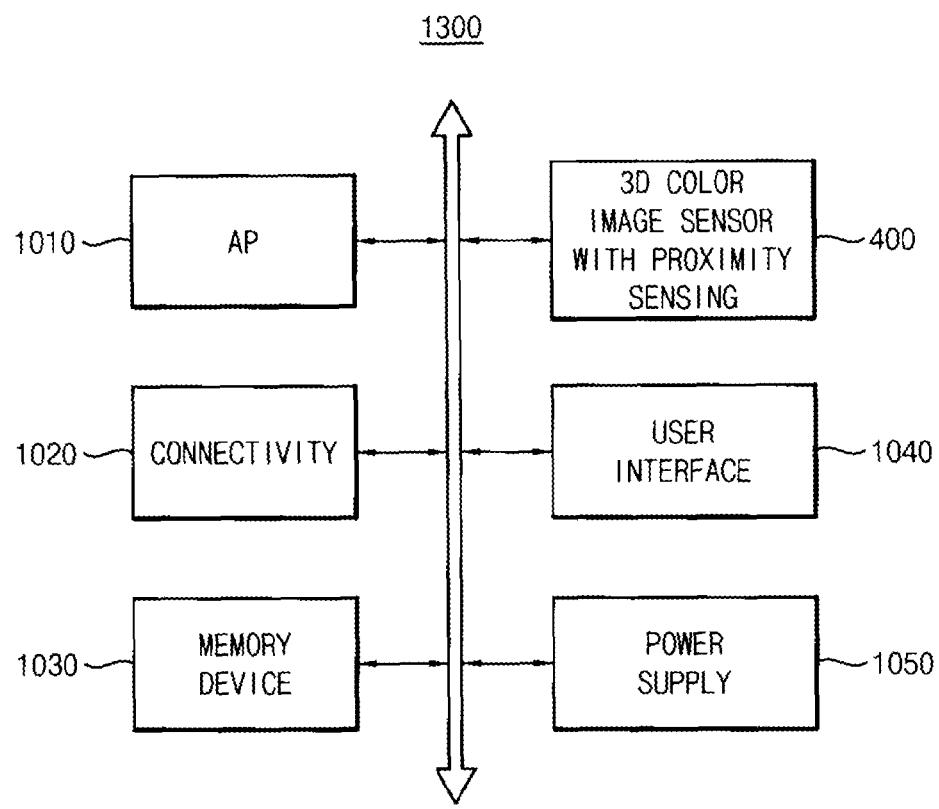
FIG. 27 is a block diagram illustrating an example of the mobile system shown in FIG. 26.

FIG. 27 is a block diagram illustrating an example of the mobile system shown in FIG. 26.

Referring to FIG. 27, the mobile system 1300 includes an application processor 1010, a connectivity unit 1020, a memory device 1030, an image sensor 400, a user interface 1040, and a power supply 1050.

When comparing with the mobile system 1100 of FIG. 14, the mobile system 1300 of FIG. 27 may further include the 3D color image sensor 400 where the 3D image sensor and the 2D image sensor are integrated and a plurality of depth pixels and color pixels constitute one pixel array.

The image sensor 400 may perform the first sensing, the second sensing and the third sensing. For instance, the image sensor 400 may primarily perform the first sensing and at least one of the second sensing and the third sensing may be performed based on the result of the first sensing.

Figure 28:
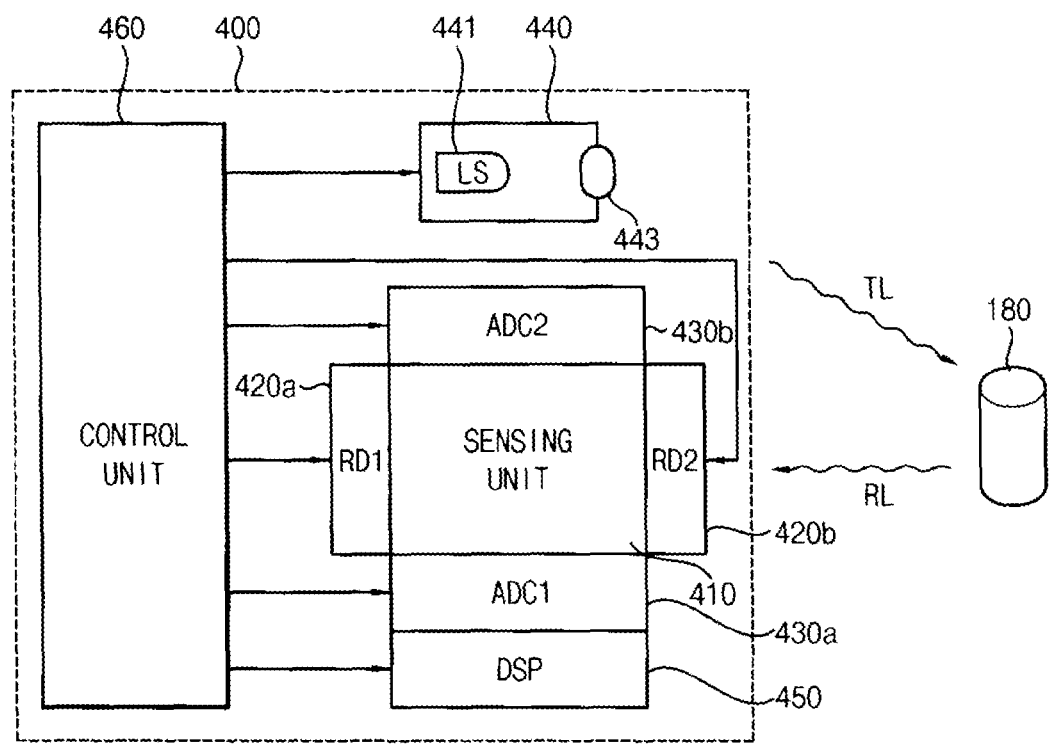
FIG. 28 is a block diagram illustrating an example of an image sensor included in the mobile system shown in FIG. 27.
Figure 29A:
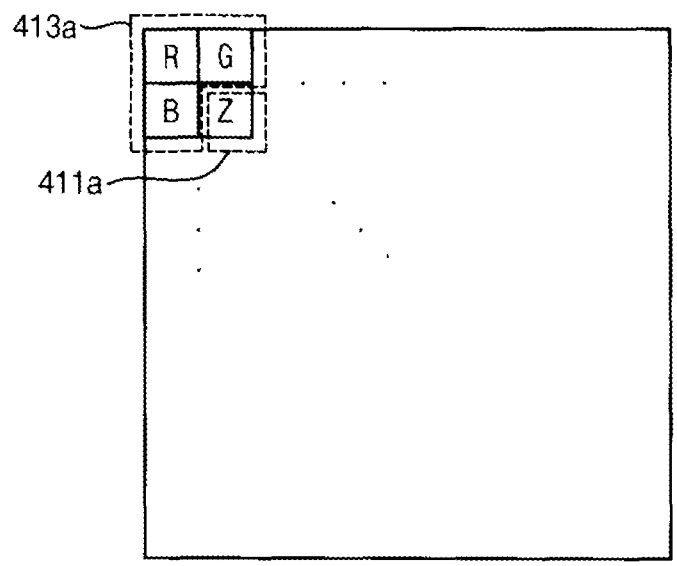
FIGS. 29A and 29B are views illustrating examples of sensing units included in the image sensor shown in FIG. 28.
Figure 29B:
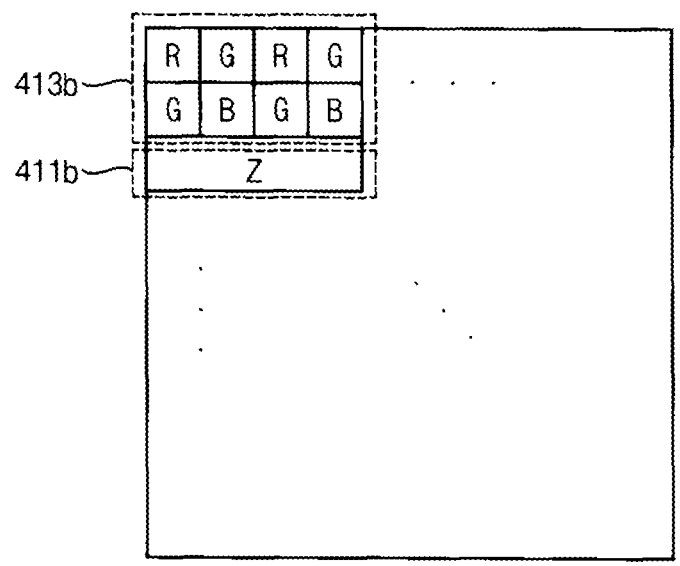

FIG. 28 is a block diagram illustrating an example of the image sensor included in the mobile system shown in FIG. 27. FIGS. 29A and 29B are views illustrating examples of sensing units included in the image sensor shown in FIG. 28.

Referring to FIG. 28, the image sensor 400 may include a sensing unit 410, a first row driving unit 420a, a second row driving unit 420b, a first ADC (Analog-to-Digital Converting) unit 430a, a second ADC unit 430b, a light source unit 440, a DSP (Digital Signal Processing) unit 450, and a control unit 460.

The light source unit 440 may output light TL having a desired wavelength (that may or may not be predetermined; e.g., infrared rays or near-infrared rays). The light source unit 440 may be selectively activated or emit lights having mutually different brightness according to the operation mode. The light source unit 440 may include a light source 441 to generate the light TL and a lens 443 to concentrate the light onto the subject 180.

The sensing unit 410 may provide distance information by receiving light RL reflected from the subject 180 and converting the light RL into an electric signal. In addition, the sensing unit 410 may provide color image information by converting incident light (for instance, visible ray) into an electric signal.

The sensing unit 410 may include a plurality of depth pixels and color pixels. According to some example embodiments, the depth pixels and color pixels may be included in the sensing unit 410 with various number ratios and size ratios. For instance, a sensing unit 410a may include depth pixels 411a and color pixels 413a as shown in FIG. 29A or a sensing unit 410b may include depth pixels 411b and color pixels 413b as shown in FIG. 29B. In some example embodiments, an infrared filter (or near-infrared filter) is formed over the depth pixels and color filters (for instance, red, green(s), and blue filters) are formed over the color pixels.

The first row driving unit 420a is connected to each row of the color pixels and may generate a first driving signal to drive each row of the color pixels. The second row driving unit 420b is connected to each row of the depth pixels and may generate a second driving signal to drive each row of the depth pixels. The first ADC unit 430a is connected to each column of the color pixels and may convert a first analog signal output from each column of the color pixels into a first digital signal. The second ADC unit 430b is connected to each column of the depth pixels and may convert a second analog signal output from each column of the depth pixels into a second digital signal. The DSP unit 450 receives the first and second digital signals output from the first and second ADC units 430a and 430b to perform the image data processing with respect to the first and second digital signals. The control unit 460 may control the first row driving unit 420a, the second row driving unit 420b, the first ADC unit 430a, the second ADC unit 430b, the light source unit 440, and the DSP unit 450.

Figure 30:
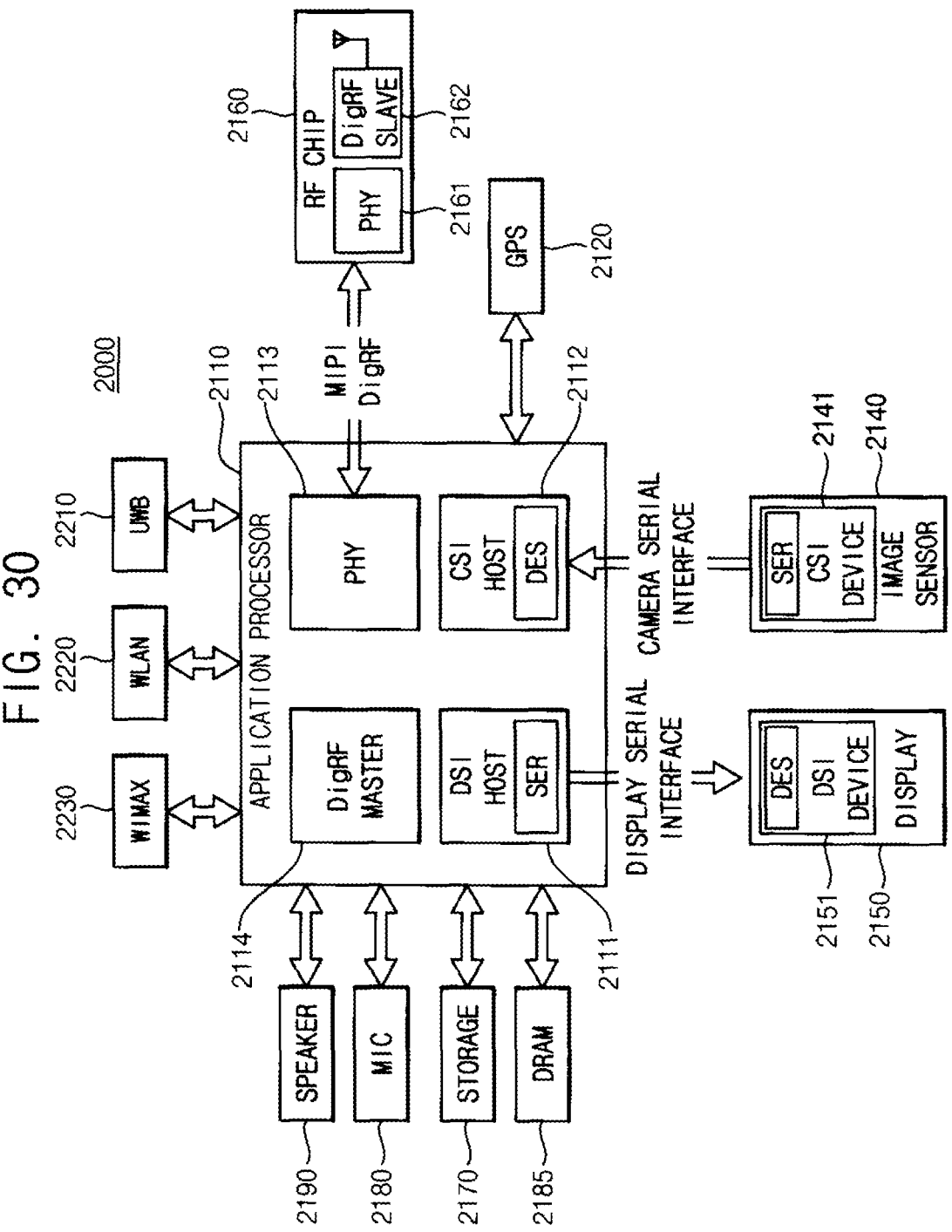
FIG. 30 is a block diagram illustrating an example of an interface used in a mobile system according to some example embodiments.

FIG. 30 is a block diagram illustrating an example of an interface used in the mobile system according to some example embodiments.

Referring to FIG. 30, the mobile system 2000 may be implemented as a data processing device (for instance, a portable phone, a personal digital assistant, a portable multimedia player, or a smart phone) that uses or supports a Mobile Industry Processor Interface (MIPI) interface, and may include an application processor 2110, an image sensor 2140, and a display 2150.

A CSI host 2112 of the application processor 2110 can make serial communication with a CSI device 2141 of the image sensor 2140 through a camera serial interface (CSI). In one embodiment, the CSI host 2112 may include an optical serializer DES and the CSI device 2141 may include an optical serializer SER. A DSI host 2111 of the application processor 2110 can make serial communication with a DSI device 2151 of the display 2150 through a display serial interface (DSI). In one embodiment, the DSI host 2111 may include an optical serializer SER and the DSI device 2151 may include an optical serializer DES.

In addition, the mobile system 2000 may further include an RF (radio frequency) chip 2160 which can make communication with the application processor 2110. Data may be transceived between a PHY (physical layer) 2113 of the mobile system 2000 and a PHY 2161 of the RF chip 2160 according to the MIPI DigRF. In addition, the application processor 2110 may further include a DigRF MASTER 2114 to control data transmission according to the MIPI DigRF and the RF chip 2160 may further include a DigRF SLAVE 2162 which is controlled by the DigRF MASTER 2114.

Meanwhile, the mobile system may include a GPS (Global Positioning System) 2120, a storage 2170, a microphone 2180, a DRAM (Dynamic Random Access Memory) 2185, and a speaker 2190. In addition, the mobile system 2000 can perform the communication using a UWB (Ultra WideBand) 2210, a WLAN (Wireless Local Area Network) 2220, and a WIMAX (Worldwide Interoperability for Microwave Access) 2230. The structure and the interface of the mobile system 2000 are illustrative purposes only and example embodiments may not be limited thereto.

Some example embodiments can be applied to the 3D image sensor capable of performing proximity sensing and gesture recognition and the mobile system including the same. For instance, some example embodiments can be applied to various terminals, such as a mobile phone, a smart phone, a tablet PC, a laptop computer, a personal digital assistant (PDA), a portable multimedia player (PMP), a digital camera, a music player, a portable game console, and a navigation.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A mobile system, comprising:
a three-dimensional (3D) image sensor on a first surface of the mobile system the 3D image sensor including a plurality of depth pixels and a light source unit, the 3D image sensor configured to,
activate the light source unit to emit first light having a first brightness, and perform a first sensing to detect proximity of a subject based on the first light received by a first number of activated depth pixels among the depth pixels, and
activate the light source unit emit second light having a second brightness, and perform a second sensing to recognize a gesture of the subject by acquiring distance information for the subject based on the second light received by a second number of activated depth pixels among the depth pixels, the second number being greater than the first number, the second brightness being brighter than the first brightness;
a two-dimensional (2D) image sensor on the first surface of the mobile system, the 2D image sensor configured to perform a third sensing to acquire color image information for the subject; and
a display device on the first surface of the mobile system configured to display results of the first sensing, the second sensing, and the third sensing.

2. The mobile system of claim 1, wherein the mobile system is configured to, activate a first operation mode to perform the first sensing based on a trigger signal, and selectively perform the second sensing in response to a result of the first sensing representing that the subject is proximate to the 3D image sensor.

3. The mobile system of claim 2, further comprising:

an input device configured to receive a user's input, wherein the mobile system is further configured to activate at least one of (i) a second operation mode to perform a first target operation based on the second sensing and (ii) a third operation mode to perform a second target operation based on an input signal generated by the input device in response to the subject being proximate to the 3D image sensor.

4. The mobile system of claim 3, wherein the mobile system is further configured to, activate the second operation mode in response to the subject being proximate to the 3D image sensor, and maintain an operation mode of the mobile system in the second operation mode or convert the second operation mode to the third operation mode based on the first target operation.

5. The mobile system of claim 3, wherein the mobile system is further configured to, activate the third operation mode in response to the subject being proximate to the 3D image sensor, and maintain an operation mode of the mobile system in the third operation mode or convert the third operation mode to the second operation mode based on the second target operation.

6. The mobile system of claim 3, wherein the mobile system is further configured to concurrently activate the second operation mode and the third operation mode in response to the subject being proximate to the 3D image sensor.

7. The mobile system of claim 1, wherein the mobile system is further configured to, activate a first operation mode to perform the first sensing based on a trigger signal, and perform at least one of the second sensing and the third sensing in response to a result of the first sensing representing that the subject is proximate to the 3D image sensor.

8. The mobile system of claim 7, wherein the first number of activated depth pixels are some depth pixels adjacent to each other among the depth pixels.

9. The mobile system of claim 7, wherein the 3D image sensor comprises a plurality of depth pixels and the 2D image sensor comprises a plurality of color pixels, and wherein the mobile system is further configured to activate one of (i) a second operation mode to perform the second sensing based on first depth pixels that are adjacent to each other while constituting a partial array among the depth pixels, (ii) a third operation mode to perform the second sensing based on the depth pixels, (iii) a fourth operation mode to perform the third sensing based on the color pixels, and (iv) a fifth operation mode to concurrently perform the second sensing and the third sensing based on the depth pixels and the color pixels in response to the subject being proximate to the 3D image sensor.

10. The mobile system of claim 9, wherein the mobile system is further configured to, activate the second operation mode in response to the subject being proximate to the 3D image sensor, and convert an operation mode of the mobile system from the second operation mode to one of third to fifth operation modes based on a result of the second sensing performed in the second operation mode.

11. The mobile system of claim 9, wherein the mobile system is further configured to, activate the third operation mode in response to the subject being proximate to the 3D image sensor, and maintain an operation mode of the mobile system in the third operation mode or convert from the third operation mode to one of fourth and fifth operation modes based on a result of the second sensing performed in the third operation mode.

12. The mobile system of claim 9, wherein the mobile system is further configured to perform the third sensing based on at least a part of the color pixels when the second operation mode is activated.

13. The mobile system of claim 1, wherein the 3D image sensor and the 2D image sensor are one integrated circuit chip or two integrated circuit chips separated from each other.

14. The mobile system of claim 1, wherein the 2D image sensor comprises a plurality of color pixels, and the depth pixels and the color pixels constitute one pixel array or two pixel arrays separated from each other.

15. A method of operating a mobile system that comprises a three-dimensional (3D) image sensor, a two-dimensional (2D) image sensor, and a display device, the 3D image sensor including a plurality of depth pixels and a light source unit, the 3D image sensor configured to perform a first sensing to detect proximity of a subject and a second sensing to recognize a gesture of the subject by acquiring distance information for the subject, the 2D image sensor configured to be activated when the subject is determined to be proximate to the 3D image sensor by the first sensing, the 2D image sensor configured to perform a third sensing to acquire color image information for the subject, and the display device configured to display results of at least one of the first sensing, the second sensing, or the third sensing, the method comprising:

performing, after activating the light source unit to emit first light having a first brightness, the first sensing to detect the proximity of the subject based on the first light received by a first number of activated depth pixels among the depth pixels;

performing, after activating the light source unit emit second light having a second brightness, the second sensing to recognize the gesture of the subject by acquiring the distance information for the subject based on the second light received by a second number of activated depth pixels among the depth pixels, the second number being greater than the first number, the second brightness being brighter than the first brightness when a result of the first sensing represents that the subject is proximate to the 3D image sensor; and performing the third sensing to acquire the color image information for the subject.

16. The method of claim 15, further comprising:

performing a target operation based on the second sensing.

17. The method of claim 15, wherein the first number of activated depth pixels includes some of the depth pixels, and the second number of activated depth pixels includes all of the depth pixels.

18. A method of operating an image sensor that comprises a plurality of depth pixels, a plurality of color pixels, and a light source unit, the method comprising:

performing, using a three-dimensional (3D) image sensor, a first sensing to detect proximity of a subject based on first light received by a first number of activated depth pixels among the depth pixels after activating the light source unit to emit the first light having a first brightness;

performing a second sensing, using the three-dimensional (3D) image sensor, to recognize a gesture of the subject by acquiring distance information for the subject based on second light received by a second number of activated depth pixels among the depth pixels after activating the light source unit to emit the second light having a second brightness, the second number being greater than the first number, the second brightness being brighter than the first brightness;

activating a two-dimensional (2D) image sensor in response to a result of the first sensing representing that the subject is proximate to the 3D image sensor; and performing a third sensing, using the activated 2D image sensor, to acquire color image information of the subject.

19. The method of claim 18, wherein
the performing a second sensing comprises,
performing the second sensing based on the first number of activated depth pixels, the first number of activated depth pixels being adjacent to each other and constituting a partial array among the depth pixels, and
performing the second sensing based on the second number of activated depth pixels, the second number of activated depth pixels including an entirety of the depth pixels, and
the performing a third sensing comprises,
performing the third sensing based on the color pixels, and
concurrently performing the second sensing based on the depth pixels and the third sensing based on the color pixels.

20. The method of claim 19, wherein the performing a second sensing and the performing a third sensing further comprise:
converting an operation mode of the image sensor based on a result of the first sensing.

21. The mobile system of claim 1, wherein the light source unit is configured to emit infrared light.

* * * * *